(12) United States Patent
Li et al.

(10) Patent No.: US 10,588,133 B2
(45) Date of Patent: Mar. 10, 2020

(54) DATA TRANSMISSION METHOD AND STATION

(71) Applicant: Huawei Technologies Co., Ltd., Shenzhen, Guangdong (CN)

(72) Inventors: Yunbo Li, Shenzhen (CN); Ming Gan, Shenzhen (CN); Yanchun Li, Shenzhen (CN); Xiao Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/008,656

(22) Filed: Jun. 14, 2018

(65) Prior Publication Data

US 2018/0295627 A1    Oct. 11, 2018

Related U.S. Application Data

(63) Continuation of application No. PCT/CN2016/104878, filed on Nov. 7, 2016.

(30) Foreign Application Priority Data

Dec. 15, 2015    (CN) .......................... 2015 1 0932390

(51) Int. Cl.
*H04W 72/04*    (2009.01)
*H04W 28/06*    (2009.01)
(Continued)

(52) U.S. Cl.
CPC ....... *H04W 72/0493* (2013.01); *H04L 1/1614* (2013.01); *H04L 1/1621* (2013.01);
(Continued)

(58) Field of Classification Search
CPC ........... H04W 28/065; H04W 72/0493; H04W 74/0808; H04W 84/12; H04W 72/005; H04W 74/08

See application file for complete search history.

(56) References Cited

U.S. PATENT DOCUMENTS

2007/0104162 A1*  5/2007  Kneckt .................. H04L 47/564
                                                      370/338
2009/0059877 A1*  3/2009  Utsunomiya ..... H04W 74/0808
                                                      370/338

(Continued)

FOREIGN PATENT DOCUMENTS

CN        101657029 A       2/2010
CN        102802171 A      11/2012
(Continued)

OTHER PUBLICATIONS

Jakub Majkowski et al., "Enhanced TXOP Scheme for Efficiency Improvement of WLAN IEEE 802.11e", 2006 IEEE 64th Vehicular Technology Conference: VTC 2006-Fall, Sep. 25-28, 2006, Sep. 1, 2006, pp. 1-5, XP031051540.

(Continued)

*Primary Examiner* — Mewale A Ambaye
(74) *Attorney, Agent, or Firm* — Levdig, Voit & Mayer, Ltd.

(57) ABSTRACT

Embodiments of the present invention provide a data transmission method and a station. The method includes: transmitting, by a station, data of a primary access category (AC) of the station within a current transmission opportunity (TXOP), where to-be-transmitted data of the station includes the data of the primary AC and data of at least one secondary AC; after transmission of the data of the primary AC is completed, determining, by the station, whether there is remaining time in the TXOP; and if there is remaining time in the TXOP, transmitting, by the station, the data of the at least one secondary AC within the remaining time. According to the method provided in the embodiments of the present invention, the current TXOP is fully utilized without a channel resource wasted, thereby improving data transmission efficiency of the station.

8 Claims, 9 Drawing Sheets

---

A station transmits first aggregated data of the station within a current TXOP, where the first aggregated data includes data of at least one secondary AC and the last Media Access Control protocol data unit MPDU of data of a primary AC — S401

After transmission of the data of the primary AC is completed, the station determines whether there is remaining time in the TXOP — S402

After transmission of the data of the primary AC is completed, if the station determines that there is remaining time in the TXOP, the station transmits second aggregated data within the remaining time, where the second aggregated data includes the last MPDU of data of a third secondary AC with a highest priority among the at least one secondary AC and data of a secondary AC other than the third secondary AC — S403

(51) Int. Cl.
*H04L 1/16* (2006.01)
*H04W 74/08* (2009.01)
*H04W 84/12* (2009.01)

(52) U.S. Cl.
CPC ...... *H04W 28/065* (2013.01); *H04W 74/0808* (2013.01); *H04W 84/12* (2013.01)

(56) References Cited

U.S. PATENT DOCUMENTS

| | | | |
|---|---|---|---|
| 2010/0260138 A1* | 10/2010 | Liu | H04L 5/0023 370/330 |
| 2011/0255618 A1* | 10/2011 | Zhu | H04B 7/0413 375/260 |
| 2012/0140615 A1 | 6/2012 | Gong | |
| 2014/0079046 A1 | 3/2014 | Yang et al. | |
| 2014/0192724 A1* | 7/2014 | Turunen | H04W 74/0808 370/329 |
| 2015/0063105 A1 | 3/2015 | Liu et al. | |
| 2016/0014804 A1* | 1/2016 | Merlin | H04L 5/0044 370/329 |
| 2016/0248486 A1 | 8/2016 | Zhu et al. | |
| 2018/0183548 A1* | 6/2018 | Gan | H04L 1/1614 |

FOREIGN PATENT DOCUMENTS

| | | |
|---|---|---|
| CN | 102859895 A | 1/2013 |
| JP | 2013531404 A | 8/2013 |
| JP | 2015050650 A | 3/2015 |

OTHER PUBLICATIONS

Jinsoo Ahn (Yonsei Univ), "Trigger Frame Channel Access", IEEE 802.11-15/1116r1, Sep. 15, 2015, p.-1-17, XP068098365.

Mohand Yazid et al.,"Enhancement of the TXOP Sharing designed for DL-MU-MIMO IEEE 802.11ac WLANS", 2015 IEEE Wireless Communications and Networking Conference (WCNC 2015)—Track 2: MAC and Cross-Layer Design, Jun. 18, 2015, 6 pages.

Robert Stacey, "Specification Framework for TGax", IEEE 802.11 Wireless LANs, Dec. 7, 2015. 38 pages.

Zhu et al., "TXOP Enhancement for DL MU-MIMO Support," IEEE 802.11-10/0591r0, IEEE, pp. 1-13, Institute of Electrical and Electronics Engineers—New York (May 17, 2010).

Chung et al., "A-MPDU using Fragmented MPDUs for IEEE 802.11ac MU-MIMO WLANs," 2013 IEEE International Conference of IEEE Region 10 (TENCON 2013), pp. 1-4, Institute of Electrical and Electronics Engineers—New York, New York (Oct. 25, 2013).

* cited by examiner

DATA TRANSMISSION METHOD AND STATION

CROSS-REFERENCE TO RELATED APPLICATIONS

This application is a continuation of International Application No. PCT/CN2016/104878, filed on Nov. 7, 2016, which claims priority to Chinese Patent Application No. 201510932390.0, filed on Dec. 15, 2015. The disclosures of the aforementioned applications are hereby incorporated by reference in their entireties.

TECHNICAL FIELD

Embodiments of the present invention relate to communications technologies, and in particular, to a data transmission method and a station.

BACKGROUND

In the existing Institute of Electrical and Electronics Engineers (IEEE) 802.11 standard, there are multiple cache queues (four cache queues currently) inside a station that can access a wireless local area network (WLAN), and the station temporarily stores service data with different priorities into different cache queues. Each cache queue is associated with one access category (AC), and a service data with a higher priority is temporarily stored by the station into a cache queue corresponding to an AC with a higher priority. Each AC is used to maintain one backoff counter, which is configured to contend for a transmission channel. In addition, an AC is corresponding to an enhanced distributed channel access function (EDCAF) in the station. The EDCAF is a logical function module in the station and is configured to control when data of the AC corresponding to the EDCAF is sent. Generally, when a station needs to transmit data of an AC, the station needs to contend with another station for a channel to transmit the data of the AC. When a clear channel assessment (CCA) result obtained by the station by listening is that a channel is in an idle state, a backoff counter starts to back off. When the backoff counter maintained by using the AC corresponding to data that needs to be transmitted by the station backs off to 0, the station obtains a transmission opportunity (TXOP) by initializing a frame exchange procedure, to transmit the data of the AC. The TXOP is a time length for occupying a channel by the station.

At present, an implementation of the IEEE 802.11 standard is as follows: After obtaining a TXOP for an AC, a station may transmit data of the AC once or for many times. After transmission of the data of the AC is completed, a channel is released by sending a CF-End frame.

However, in a prior-art data transmission method, a channel is released after transmission of data corresponding to an AC for which the channel is obtained by means of contention is completed, wasting a channel resource, and further affecting data transmission efficiency of a system.

SUMMARY

Embodiments of the present invention provide a data transmission method and a station, to resolve a prior-art technical problem that a channel resource is wasted and low data transmission efficiency of a station is caused because a channel is directly released in the prior art when transmission of data of an AC is completed but there is still remaining time in a TXOP.

According to a first aspect, an embodiment of the present invention provides a data transmission method, including:

transmitting, by a station, data of a primary AC of the station within a current transmission opportunity TXOP, where to-be-transmitted data of the station includes the data of the primary AC and data of at least one secondary AC;

after transmission of the data of the primary AC is completed, determining, by the station, whether there is remaining time in the TXOP; and if there is remaining time in the TXOP, transmitting, by the station, the data of the at least one secondary AC within the remaining time.

According to the data transmission method provided in the first aspect, when transmission of the data of the primary AC is completed and there is still remaining time in the current TXOP, the station transmits data of secondary ACs of the station within the remaining time, so that the current TXOP is fully utilized without a channel resource wasted, thereby improving data transmission efficiency of the station.

With reference to the first aspect, in a first possible implementation of the first aspect, the transmitting, by the station, the data of the at least one secondary AC within the remaining time specifically includes:

determining, by the station, a priority sequence of first secondary ACs in a first secondary AC group of the station, where the first secondary AC group includes at least one first secondary AC, and the first secondary AC is a secondary AC that is corresponding to to-be-transmitted data; and sequentially transmitting, by the station, data of the first secondary ACs in the first secondary AC group within the remaining time in a descending priority sequence.

With reference to the first aspect, in a second possible implementation of the first aspect, the transmitting, by the station, the data of the at least one secondary AC within the remaining time specifically includes:

determining, by the station from the at least one secondary AC, a second secondary AC group whose priority is higher than that of the primary AC, where the second secondary AC group includes at least one second secondary AC, and the second secondary AC is a secondary AC that is corresponding to to-be-transmitted data; and transmitting, by the station, data of the second secondary AC group within the remaining time.

With reference to the second possible implementation of the first aspect, in a third possible implementation of the first aspect, the transmitting, by the station, data of the second secondary AC group within the remaining time specifically includes:

determining, by the station, a priority of each second secondary AC in the second secondary AC group; and sequentially transmitting, by the station, data of the second secondary ACs within the remaining time in descending order of the priorities of the second secondary ACs.

According to the data transmission method provided in the first possible implementation, the second possible implementation, and the third possible implementation of the first aspect, the priorities of the secondary ACs are determined, and the data of the secondary ACs is transmitted within the remaining time in the TXOP according to the priorities of the secondary ACs. In this way, fairness and reliability of data transmission can be ensured, and data transmission efficiency of the station can be further improved.

With reference to the first aspect, in a fourth possible implementation of the first aspect, the transmitting, by a station, data of a primary AC of the station within a current transmission opportunity TXOP specifically includes:

transmitting, by the station, first aggregated data of the station within the TXOP, where the first aggregated data includes the data of the at least one secondary AC and the last Media Access Control protocol data unit MPDU of the data of the primary AC.

With reference to the fourth possible implementation of the first aspect, in a fifth possible implementation of the first aspect, the transmitting, by the station, the data of the at least one secondary AC within the remaining time specifically includes:

transmitting, by the station, second aggregated data within the remaining time, where the second aggregated data includes the last MPDU of data of a third secondary AC with a highest priority among the at least one secondary AC and data of a secondary AC other than the third secondary AC.

With reference to the fourth possible implementation of the first aspect, in a sixth possible implementation of the first aspect, the transmitting, by the station, the data of the at least one secondary AC within the remaining time specifically includes:

transmitting, by the station, third aggregated data within the remaining time, where the third aggregated data includes the last MPDU of data corresponding to a higher-priority traffic identifier TID in the secondary AC and at least one MPDU of data corresponding to a lower-priority TID in the secondary AC.

According to the data transmission method provided in the fourth possible implementation, the fifth possible implementation, and the sixth possible implementation of the first aspect, data of one or more ACs is aggregated and transmitted. Therefore, quantities of to-be-transmitted acknowledgment frames and inter-frame spacings within the current TXOP are reduced, so that the station can transmit the data of the one or more ACs to the utmost within the current TXOP, thereby improving data transmission efficiency of the station and reducing channel resources for use.

With reference to the first aspect, in a seventh possible implementation of the first aspect, before the transmitting, by a station, data of a primary AC of the station within a current transmission opportunity TXOP, the method further includes:

receiving, by the station, a trigger frame TF that carries an identifier of the primary AC and that is sent by a wireless access point AP, where the TF is used to instruct the station to aggregate the data of the primary AC;

determining, by the station, according to the instruction of the TF, whether there is to-be-transmitted data of the primary AC; and if there is to-be-transmitted data of the primary AC, aggregating, by the station, the data of the primary AC to obtain fourth aggregated data; and the transmitting, by a station, data of a primary AC of the station within a current transmission opportunity TXOP specifically includes:

sending, by the station, the fourth aggregated data to the AP within the TXOP.

With reference to the seventh possible implementation of the first aspect, in an eighth possible implementation of the first aspect, the station aggregates the data of the at least one secondary AC when the station determines, according to the instruction of the TF, that there is no to-be-transmitted data of the primary AC.

With reference to the eighth possible implementation of the first aspect, in a ninth possible implementation of the first aspect, that the station aggregates the data of the at least one secondary AC when the station determines, according to the instruction of the TF, that there is no to-be-transmitted data of the primary AC specifically includes:

when the station determines, according to the instruction of the TF, that there is no to-be-transmitted data of the primary AC, the station aggregates data of a secondary AC whose priority is higher than that of the primary AC; or when the station determines, according to the instruction of the TF, that there is no to-be-transmitted data of the primary AC, the station aggregates data of a secondary AC with a highest priority among the at least one secondary AC.

According to the data transmission method provided in the seventh possible implementation, the eighth possible implementation, and the ninth possible implementation of the first aspect, a multi-user uplink transmission scenario is described: Within the current TXOP, each non-AP station may determine, according to the TF from the AP, an AC that is to be aggregated during next uplink transmission, aggregate data of the corresponding the AC, and transmit, to the AP, aggregated data obtained by means of aggregation. In this way, time of the TXOP is utilized more fully, and quantities of to-be-transmitted acknowledgment frames and inter-frame spacings are reduced by means of data aggregation, thereby reducing channel resources and improving data transmission efficiency of the station.

With reference to the first aspect, in a tenth possible implementation of the first aspect, before the transmitting, by a station, data of a primary AC of the station within a current transmission opportunity TXOP, the method further includes:

sending, by the station, a first message to a wireless access point AP, where the first message is used to indicate, to the AP, whether there is to-be-transmitted data of each AC of the station, so that the AP sends a trigger frame TF to the station according to the first message;

receiving, by the station, the TF that carries an identifier of the primary AC and that is sent by the AP, where the TF is used to instruct the station to aggregate the data of the primary AC; and aggregating, by the station, the data of the primary AC according to the TF to obtain fifth aggregated data; and the transmitting, by a station, data of a primary AC of the station within a current transmission opportunity TXOP specifically includes:

sending, by the station, the fifth aggregated data to the AP within the TXOP.

According to the data transmission method provided in the tenth possible implementation of the first aspect, a multi-user uplink transmission scenario is described: Within the current TXOP, each non-AP station may determine, according to the TF from the AP, a type of an AC that is to be aggregated during next uplink transmission, aggregate data of the AC of the corresponding type, and transmit, to the AP, aggregated data obtained by means of aggregation. In this way, time of the TXOP is utilized more fully, and quantities of to-be-transmitted acknowledgment frames and inter-frame spacings are reduced by means of data aggregation, thereby reducing channel resources and improving data transmission efficiency of the station.

According to a second aspect, the present invention provides a station, including:

a transceiver module, configured to transmit data of a primary AC of the station within a current transmission opportunity TXOP, where to-be-transmitted data of the station includes the data of the primary AC and data of at least one secondary AC; and a first determining module, configured to: after transmission of the data of the primary AC is completed, determine, by the station, whether there is remaining time in the TXOP; where the transceiver module is further configured to: when the first determining module determines that there is remaining time in the TXOP, transmit the data of the at least one secondary AC within the remaining time.

With reference to the second aspect, in a first possible implementation of the second aspect, that the transceiver module is configured to transmit the data of the at least one secondary AC within the remaining time includes:

the transceiver module is specifically configured to: determine a priority sequence of first secondary ACs in a first secondary AC group of the station; and sequentially transmit data of the first secondary ACs in the first secondary AC group within the remaining time in a descending priority sequence, where the first secondary AC group includes at least one first secondary AC, and the first secondary AC is a secondary AC that is corresponding to to-be-transmitted data.

With reference to the second aspect, in a second possible implementation of the second aspect, that the transceiver module is configured to transmit the data of the at least one secondary AC within the remaining time includes:

the transceiver module is specifically configured to: determine, from the at least one secondary AC, a second secondary AC group whose priority is higher than that of the primary AC; and transmit data of the second secondary AC group within the remaining time, where the second secondary AC group includes at least one second secondary AC, and the second secondary AC is a secondary AC that is corresponding to to-be-transmitted data.

With reference to the second possible implementation of the second aspect, in a third possible implementation of the second aspect, that the transceiver module is specifically configured to transmit the data of the second secondary AC group within the remaining time includes:

the transceiver module is specifically configured to: determine a priority of each second secondary AC in the second secondary AC group; and sequentially transmit data of the second secondary ACs within the remaining time in descending order of the priorities of the second secondary ACs.

With reference to the second aspect, in a fourth possible implementation of the second aspect, that the transceiver module is configured to transmit the data of the primary AC of the station within the current transmission opportunity TXOP includes:

the transceiver module is specifically configured to transmit first aggregated data of the station within the TXOP, where the first aggregated data includes the data of the at least one secondary AC and the last Media Access Control protocol data unit MPDU of the data of the primary AC.

With reference to the fourth possible implementation of the second aspect, in a fifth possible implementation of the second aspect, that the transceiver module is configured to transmit the data of the at least one secondary AC within the remaining time includes:

the transceiver module is specifically configured to transmit second aggregated data within the remaining time, where the second aggregated data includes the last MPDU of data of a third secondary AC with a highest priority among the at least one secondary AC and data of a secondary AC other than the third secondary AC.

With reference to the fourth possible implementation of the second aspect, in a sixth possible implementation of the second aspect, that the transceiver module is configured to transmit the data of the at least one secondary AC within the remaining time includes:

the transceiver module is specifically configured to transmit third aggregated data within the remaining time, where the third aggregated data includes the last MPDU of data corresponding to a higher-priority traffic identifier TID in the secondary AC and at least one MPDU of data corresponding to a lower-priority TID in the secondary AC.

With reference to the second aspect, in a seventh possible implementation of the second aspect, the station further includes a second determining module and a first aggregation module;

the transceiver module is further configured to: before transmitting the data of the primary AC of the station within the current transmission opportunity TXOP, receive a trigger frame TF that carries an identifier of the primary AC and that is sent by a wireless access point AP, where the TF is used to instruct the station to aggregate the data of the primary AC;

the second determining module is configured to determine, according to the instruction of the TF, whether there is to-be-transmitted data of the primary AC;

the first aggregation module is configured to: when the second determining module determines that there is to-be-transmitted data of the primary AC, aggregate the data of the primary AC to obtain fourth aggregated data; and that the transceiver module is configured to transmit the data of the primary AC of the station within the current transmission opportunity TXOP includes:

the transceiver module is specifically configured to send the fourth aggregated data to the AP within the TXOP.

With reference to the seventh possible implementation of the second aspect, in an eighth possible implementation of the second aspect, the first aggregation module is further configured to aggregate the data of the at least one secondary AC when the second determining module determines that there is no to-be-transmitted data of the primary AC.

With reference to the eighth possible implementation of the second aspect, in a ninth possible implementation of the second aspect, the first aggregation module is specifically configured to: when the second determining module determines, according to the instruction of the TF, that there is no to-be-transmitted data of the primary AC, aggregate data of a secondary AC whose priority is higher than that of the primary AC; or when the second determining module determines, according to the instruction of the TF, that there is no to-be-transmitted data of the primary AC, aggregate data of a secondary AC with a highest priority among the at least one secondary AC.

With reference to the second aspect, in a tenth possible implementation of the second aspect, the station further includes a second aggregation module;

the transceiver module is further configured to: before transmitting the data of the primary AC of the station within the current transmission opportunity TXOP, send a first message to a wireless access point AP; and receive a TF that carries an identifier of the primary AC and that is sent by the AP, where the first message is used to indicate, to the AP, whether there is to-be-transmitted data of each AC of the station, so that the AP sends the trigger frame TF to the station according to the first message, and the TF is used to instruct the station to aggregate the data of the primary AC;

the second aggregation module is configured to aggregate the data of the primary AC according to the TF to obtain fifth aggregated data; and that the transceiver module is configured to transmit the data of the primary AC of the station within the current transmission opportunity TXOP includes:

the transceiver module is specifically configured to send the fifth aggregated data to the AP within the TXOP.

For beneficial effects of the data transmission method provided in the second aspect and the possible implementations of the second aspect, reference may be made to the beneficial effects brought by the first aspect and the possible implementations of the first aspect. Details are not described herein again.

According to a third aspect, the present invention provides a station, including:

a transceiver, configured to transmit data of a primary AC of the station within a current transmission opportunity TXOP, where to-be-transmitted data of the station includes the data of the primary AC and data of at least one secondary AC; and a processor, configured to: after transmission of the data of the primary AC is completed, determine, by the station, whether there is remaining time in the TXOP; where the transceiver is further configured to: when the processor determines that there is remaining time in the TXOP, transmit the data of the at least one secondary AC within the remaining time.

With reference to the third aspect, in a first possible implementation of the third aspect, that the transceiver is configured to transmit the data of the at least one secondary AC within the remaining time includes:

the transceiver is specifically configured to: determine a priority sequence of first secondary ACs in a first secondary AC group of the station; and sequentially transmit data of the first secondary ACs in the first secondary AC group within the remaining time in a descending priority sequence, where the first secondary AC group includes at least one first secondary AC, and the first secondary AC is a secondary AC that is corresponding to to-be-transmitted data.

With reference to the third aspect, in a second possible implementation of the third aspect, that the transceiver is configured to transmit the data of the at least one secondary AC within the remaining time includes:

the transceiver is specifically configured to: determine, from the at least one secondary AC, a second secondary AC group whose priority is higher than that of the primary AC; and transmit data of the second secondary AC group within the remaining time, where the second secondary AC group includes at least one second secondary AC, and the second secondary AC is a secondary AC that is corresponding to to-be-transmitted data.

With reference to the second possible implementation of the third aspect, in a third possible implementation of the third aspect, that the transceiver is specifically configured to transmit the data of the second secondary AC group within the remaining time includes:

the transceiver is specifically configured to: determine a priority of each second secondary AC in the second secondary AC group; and sequentially transmit data of the second secondary ACs within the remaining time in descending order of the priorities of the second secondary ACs.

With reference to the third aspect, in a fourth possible implementation of the third aspect, that the transceiver is configured to transmit the data of the primary AC of the station within the current transmission opportunity TXOP includes:

the transceiver is specifically configured to transmit first aggregated data of the station within the TXOP, where the first aggregated data includes the data of the at least one secondary AC and the last Media Access Control protocol data unit MPDU of the data of the primary AC.

With reference to the fourth possible implementation of the third aspect, in a fifth possible implementation of the third aspect, that the transceiver is configured to transmit the data of the at least one secondary AC within the remaining time includes:

the transceiver is specifically configured to transmit second aggregated data within the remaining time, where the second aggregated data includes the last MPDU of data of a third secondary AC with a highest priority among the at least one secondary AC and data of a secondary AC other than the third secondary AC.

With reference to the fourth possible implementation of the third aspect, in a sixth possible implementation of the third aspect, that the transceiver is configured to transmit the data of the at least one secondary AC within the remaining time includes:

the transceiver is specifically configured to transmit third aggregated data within the remaining time, where the third aggregated data includes the last MPDU of data corresponding to a higher-priority traffic identifier TID in the secondary AC and at least one MPDU of data corresponding to a lower-priority TID in the secondary AC.

With reference to the third aspect, in a seventh possible implementation of the third aspect, the transceiver is further configured to: before transmitting the data of the primary AC of the station within the current transmission opportunity TXOP, receive a trigger frame TF that carries an identifier of the primary AC and that is sent by a wireless access point AP, where the TF is used to instruct the station to aggregate the data of the primary AC;

the processor is further configured to: determine, according to the instruction of the TF, whether there is to-be-transmitted data of the primary AC; and when determining that there is to-be-transmitted data of the primary AC, aggregate the data of the primary AC to obtain fourth aggregated data; and that the transceiver is configured to transmit the data of the primary AC of the station within the current transmission opportunity TXOP includes:

the transceiver is specifically configured to send the fourth aggregated data to the AP within the TXOP.

With reference to the seventh possible implementation of the third aspect, in an eighth possible implementation of the third aspect, the processor is further configured to aggregate the data of the at least one secondary AC when determining that there is no to-be-transmitted data of the primary AC.

With reference to the eighth possible implementation of the third aspect, in a ninth possible implementation of the third aspect, the processor is specifically configured to: when determining, according to the instruction of the TF, that there is no to-be-transmitted data of the primary AC, aggregate data of a secondary AC whose priority is higher than that of the primary AC; or when determining, according to the instruction of the TF, that there is no to-be-transmitted data of the primary AC, aggregate data of a secondary AC with a highest priority among the at least one secondary AC.

With reference to the third aspect, in a tenth possible implementation of the third aspect, the transceiver is further configured to: before transmitting the data of the primary AC of the station within the current transmission opportunity TXOP, send a first message to a wireless access point AP; and receive a TF that carries an identifier of the primary AC and that is sent by the AP, where the first message is used to indicate, to the AP, whether there is to-be-transmitted data of each AC of the station, so that the AP sends the trigger frame TF to the station according to the first message, and the TF is used to instruct the station to aggregate the data of the primary AC;

the processor is further configured to aggregate the data of the primary AC according to the TF to obtain fifth aggregated data; and that the transceiver is configured to transmit the data of the primary AC of the station within the current transmission opportunity TXOP includes:

the transceiver is specifically configured to send the fifth aggregated data to the AP within the TXOP.

With reference to the first aspect and the possible implementations of the first aspect, the second aspect and the possible implementations of the second aspect, and the third aspect and the possible implementations of the third aspect, the fourth aggregated data includes the data of the at least one secondary AC and the last MPDU of the data of the primary AC.

Optionally, for uplink transmission corresponding to a TF delivered by the AP for any one time, in all aggregated data transmitted by each station, when at least one piece of aggregated data is entirely composed of the data of the primary AC, the uplink transmission is used to instruct the AP to continue instructing, in a TF delivered next time, the station to continue aggregating the data of the primary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of a secondary AC during next uplink transmission.

Optionally, all the aggregated data transmitted by the station includes an indication field; and for uplink transmission corresponding to a TF delivered by the AP for any one time, in all the aggregated data transmitted by each station, when at least one piece of aggregated data is entirely composed of the data of the primary AC and an indication field in at least one piece of aggregated data is 1, the indication field is used to instruct the AP to continue instructing, in a TF delivered next time, the station to continue aggregating the data of the primary AC during next uplink transmission;

or for uplink transmission corresponding to a TF delivered by the AP for any one time, when all indication fields in aggregated data, including the data of the primary AC, of all the aggregated data transmitted by each station are 0, the indication field is used to instruct the AP to instruct, in a TF delivered next time, the station to aggregate data of a secondary AC during next uplink transmission.

Optionally, that the indication field is used to instruct the AP to instruct, in a TF delivered next time, the station to aggregate data of a secondary AC during next uplink transmission specifically includes:

the indication field is used to instruct the AP to instruct, in the TF delivered next time, the station to aggregate, during the next uplink transmission, data of a secondary AC whose priority is higher than that of the primary AC;

or the indication field is used to instruct the AP to instruct, in the TF delivered next time, the station to aggregate data of a secondary AC with a highest priority during the next uplink transmission.

Optionally, the fifth aggregated data includes the data of the at least one secondary AC and the last MPDU of the data of the primary AC.

Optionally, all aggregated data transmitted by the station includes an indication field; and for uplink transmission corresponding to a TF delivered by the AP for any one time, when all the aggregated data transmitted by each station is entirely composed of the data of the primary AC and indication fields in all the aggregated data are 1, the uplink transmission is used to instruct the AP to continue instructing, in a TF delivered next time, the station to aggregate the data of the primary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data does not include the data of the primary AC, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, or when none of the aggregated data includes the data of the primary AC, the uplink transmission is used to instruct the AP to instruct, in a TF delivered next time, the station to aggregate data of a secondary AC during next uplink transmission.

Optionally, for uplink transmission corresponding to a TF delivered by the AP for any one time, when all aggregated data transmitted by each station is entirely composed of the data of the primary AC, the uplink transmission is used to instruct the AP to continue instructing, in a TF delivered next time, the station to aggregate the data of the primary AC during next uplink transmission;

or for uplink transmission corresponding to a TF delivered by the AP for any one time, in all aggregated data transmitted by each station, when at least one piece of aggregated data is entirely composed of the data of the primary AC and at least one piece of aggregated data includes data of a secondary AC, the uplink transmission is used to instruct the AP to instruct, in a TF delivered next time, the station to aggregate the data of the primary AC and data of a secondary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of one or more secondary ACs during next uplink transmission.

For beneficial effects of the data transmission method provided in the third aspect and the possible implementations of the third aspect, reference may be made to the beneficial effects brought by the first aspect and the possible implementations of the first aspect. Details are not described herein again.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A method in the embodiments of the present invention may be applicable to a wireless local area network (WLAN). At present, a standard used for the WLAN is the Institute of Electrical and Electronics Engineers (IEEE) 802.11 series. The WLAN network includes a wireless access point (AP) and a non-AP station that communicate with each other. Both the AP and the non-AP station may be referred to as stations.

The AP is an access point used by a mobile user to access a wired network and is mainly deployed at home, or inside a building or a campus, and a coverage radius is typically tens to hundreds of meters. Certainly, the AP may alternatively be deployed outdoors. The AP is equivalent to a bridge connecting a wired network and a wireless network. Main functions of the AP are connecting wireless network clients together, and connecting the wireless network to an Ethernet. Specifically, the AP may be a terminal device or network device having a WiFi (Wireless Fidelity) chip. Optionally, the AP may be a device supporting the 802.11ax standard. Further, optionally, the AP may be a device supporting multiple WLAN standards such as 802.11ac, 802.11n, 802.11g, 802.11b, and 802.11a.

The non-AP station may be a wireless communications chip, a wireless sensor, or a wireless communications terminal. For example, the non-AP station is a mobile phone supporting a WiFi communication function, a tablet computer supporting a WiFi communication function, a set top box supporting a WiFi communication function, a smart TV supporting a WiFi communication function, a smart wearable device supporting a WiFi communication function, an in-vehicle communications device supporting a WiFi communication function, or a computer supporting a WiFi communication function. Optionally, the non-AP station may support the 802.11ax standard. Further, optionally, the non-AP station supports multiple WLAN standards such as 802.11ac, 802.11n, 802.11g, 802.11b, and 802.11a.

Figure 1:
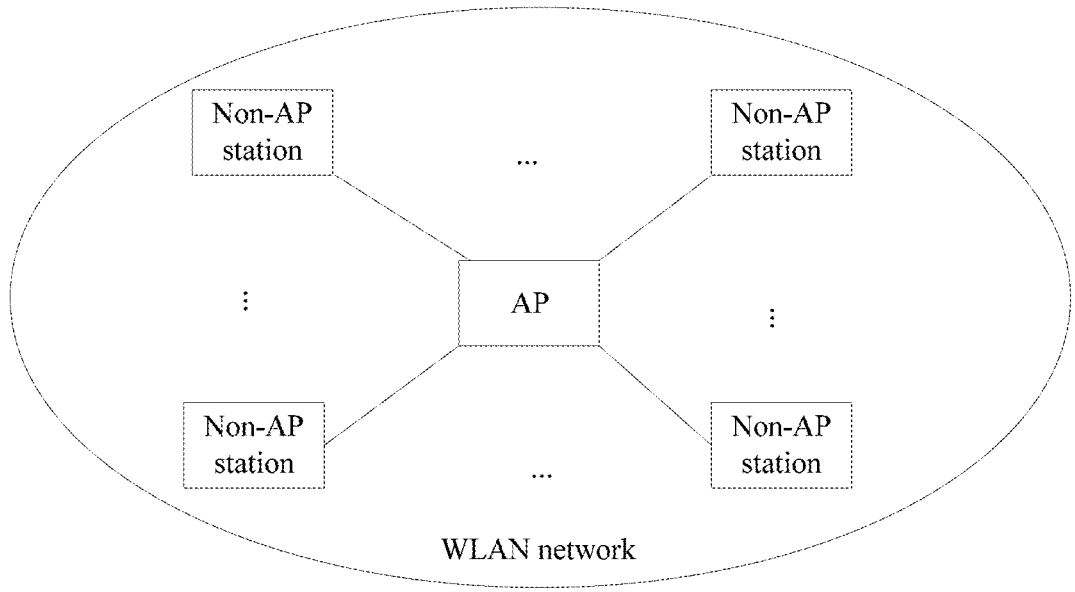
FIG. 1 is a schematic structural diagram of a WLAN system according to an embodiment of the present invention.

FIG. 1 is a schematic structural diagram of a WLAN system according to the present invention. As shown in FIG. 1, in the WLAN system, one AP may communicate with multiple STAs (non-AP stations).

When a station needs to send data of an AC, the station needs to contend for a channel for the AC, obtain a corresponding TXOP, and transmit the data of the AC within the TXOP. However, when transmission of the data of the AC is completed and there is still remaining time in the TXOP, generally, a channel is directly released in the prior art. As a result, the remaining time in the TXOP is wasted, and low data transmission efficiency of the station is caused.

A data transmission method, an apparatus, and a device that are provided in the embodiments of the present invention are to resolve a prior-art technical problem that a channel resource is wasted and low data transmission efficiency of a station is caused because a channel is directly released in the prior art when transmission of data of an AC is completed but there is still remaining time in a TXOP.

It should be noted that, in the embodiments of the present invention, primary-secondary division is performed on multiple ACs of a station. When the station contends for a channel to transmit data of an AC, the AC is a primary AC, and other ACs are secondary ACs. In addition, in the embodiments of the present invention, data of a primary AC is a data frame temporarily stored in a cache queue corresponding to the primary AC, and data of a secondary AC is a data frame temporarily stored in a cache queue corresponding to the secondary AC.

The following describes the technical solutions of the present invention in detail by using specific embodiments. The following several specific embodiments may be mutually combined, and same or similar concepts or processes may not be repeated in some embodiments.

Figure 2:
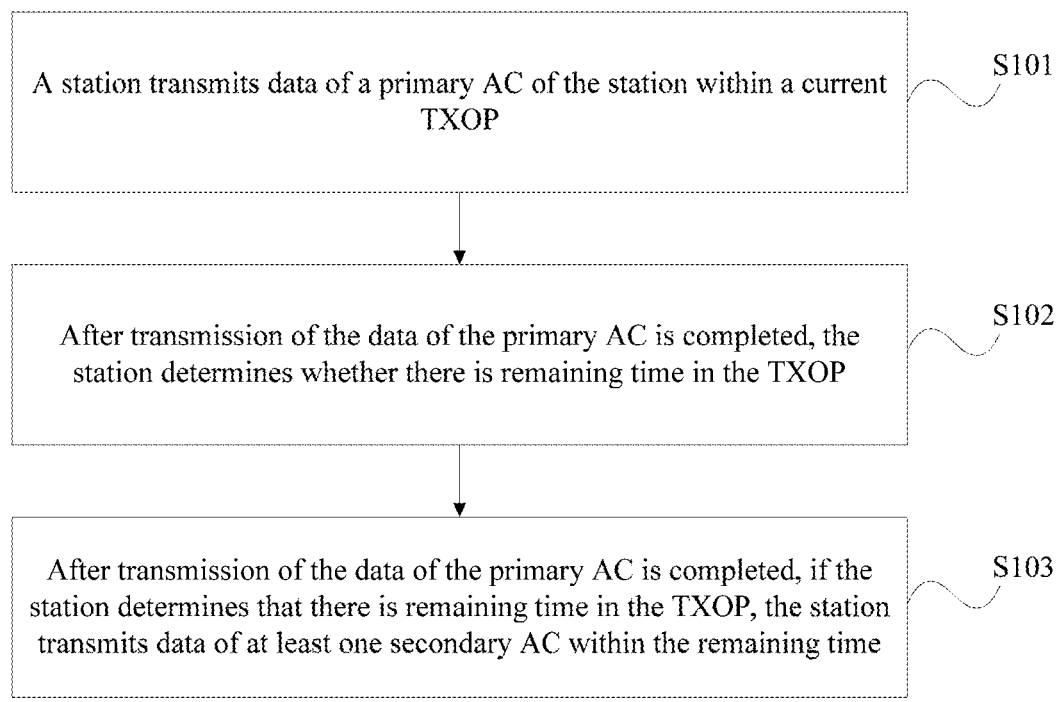
FIG. 2 is a schematic flowchart of a first data transmission method embodiment according to an embodiment of the present invention.

FIG. 2 is a schematic flowchart of a first data transmission method embodiment according to an embodiment of the present invention. This embodiment provides the following specific process: When transmission of data of a primary AC is completed and there is still remaining time in a TXOP, a station transmits data of other secondary ACs within the remaining time in the TXOP, so as to fully utilize a channel resource and improve data transmission efficiency. As shown in FIG. 2, the method includes the following steps.

S101. The station transmits data of a primary AC of the station within a current TXOP.

Specifically, to-be-transmitted data of the station in this embodiment may include the data of the primary AC and data of at least one secondary AC. The station may be an AP, or may be a non-AP station such as a STA. Optionally, an AC of the station may include four types: AC_VO, AC_VI, AC_BE, and AC_BK. Certainly, a specific implementation is unnecessarily limited to the four current AC types.

The TXOP may be obtained by an AP by means of channel contention performed for transmission of data of a primary AC of the AP, may be obtained by a STA by means of channel contention performed for transmission of data of a primary AC of the STA, or may be obtained by means of scheduling performed by an AP on a STA for transmission of data of a primary AC of the STA.

S102. After transmission of the data of the primary AC is completed, the station determines whether there is remaining time in the TXOP.

S103. After transmission of the data of the primary AC is completed, if the station determines that there is remaining time in the TXOP, the station transmits data of at least one secondary AC within the remaining time.

Figure 3:
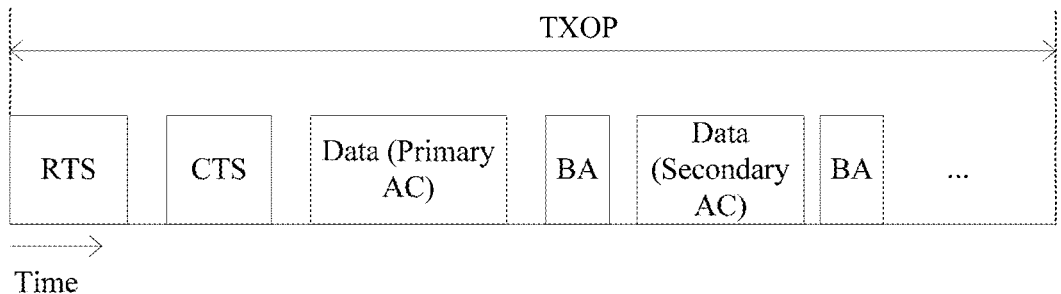
FIG. 3 is a first schematic data transmission diagram according to an embodiment of the present invention.

Specifically, after transmission of the data of the primary AC is completed, when the station determines that there is remaining time in the TXOP, the station may transmit the data of the at least one secondary AC within the remaining time. Optionally, the station may randomly select data of one or more secondary ACs for transmission, or may select data of a corresponding secondary AC according to priorities of secondary ACs for transmission. In this embodiment, a secondary AC type and quantity selected by the station are not limited provided that the station transmits data of a secondary AC within the remaining time in the TXOP. In this way, it can be ensured that the current TXOP is fully utilized without a channel resource wasted, thereby improving data transmission efficiency of the station. For details, reference may be made to a first schematic data transmission diagram shown in FIG. 3. An RTS and a CTS in FIG. 3 are a request to send/clear to send (Request To Send/Clear To Send) protocol, and a BA is a block acknowledgment (Block ACK) frame.

According to the data transmission method provided in the present invention, when transmission of the data of the primary AC is completed and there is still remaining time in the current TXOP, the station transmits data of other secondary ACs of the station within the remaining time, so that the current TXOP is fully utilized without a channel resource wasted, thereby improving data transmission efficiency of the station.

Figure 4:
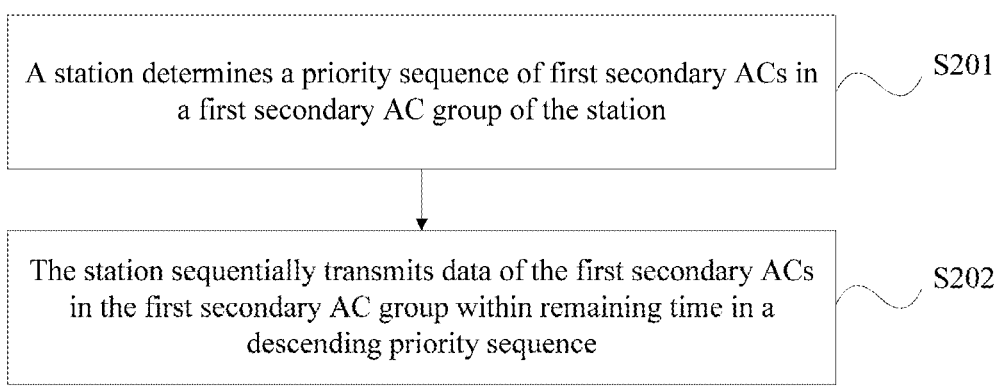
FIG. 4 is a schematic flowchart of a possible implementation of a first data transmission method embodiment according to an embodiment of the present invention.

Optionally, in a possible implementation of the first embodiment, the implementation provides a specific process in which the station transmits data of a secondary AC of the station within the foregoing remaining time. Based on the foregoing first embodiment, referring to FIG. 4, S103 may include the following steps.

S201. The station determines a priority sequence of first secondary ACs in a first secondary AC group of the station.

Specifically, the first secondary AC group includes at least one first secondary AC. The first secondary AC is a secondary AC, corresponding to to-be-transmitted data, of the station. Therefore, the station may determine the priority sequence of the first secondary ACs. Optionally, according to the existing IEEE 802.11 standard, to-be-transmitted data of a station may include data of four types of ACs. A priority sequence of these ACs may be: a priority of AC_VO>a priority of AC_Vi>a priority of AC_BE>a priority of AC_BK.

S202. The station sequentially transmits data of the first secondary ACs in the first secondary AC group within the remaining time in a descending priority sequence.

Figure 5:
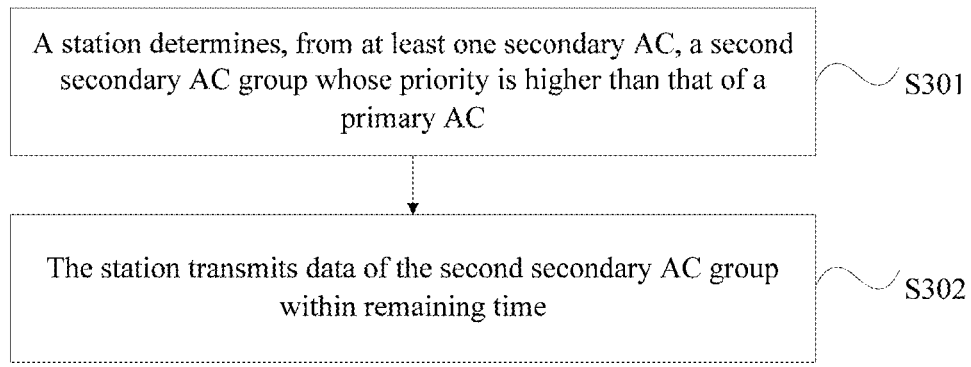
FIG. 5 is a schematic flowchart of another possible implementation of a first data transmission method embodiment according to an embodiment of the present invention.

Optionally, in another possible implementation of the first embodiment, the implementation provides another specific process in which the station transmits data of a secondary AC of the station within the foregoing remaining time. Based on the foregoing first embodiment, referring to FIG. 5, S103 may include the following steps.

S301. The station determines, from the at least one secondary AC, a second secondary AC group whose priority is higher than that of the primary AC.

The second secondary AC group may include at least one second secondary AC, and the second secondary AC is a secondary AC, corresponding to to-be-transmitted data, of the station.

S302. The station transmits data of the second secondary AC group within the remaining time.

Figure 6:
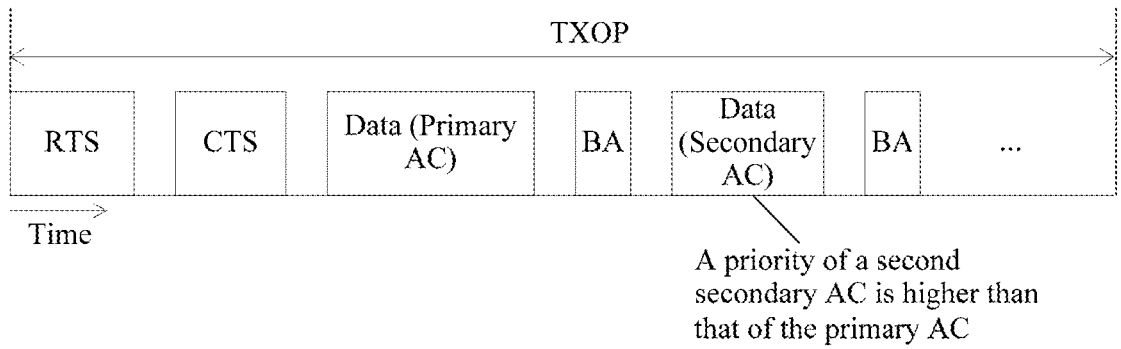
FIG. 6 is a second schematic data transmission diagram according to an embodiment of the present invention.

For details, reference may be made to a second schematic data transmission diagram shown in FIG. 6. In the implementation, there is one second secondary AC whose priority is higher than that of the primary AC. After determining the second secondary AC group, the station transmits the data of the second secondary AC group within the remaining time in the TXOP. After transmission of the data of the second secondary AC group is completed, the station releases a channel resource. It should be noted that, in the implementation, a manner of transmitting data of second secondary ACs in the second secondary AC group by the station is not limited.

Figure 7:
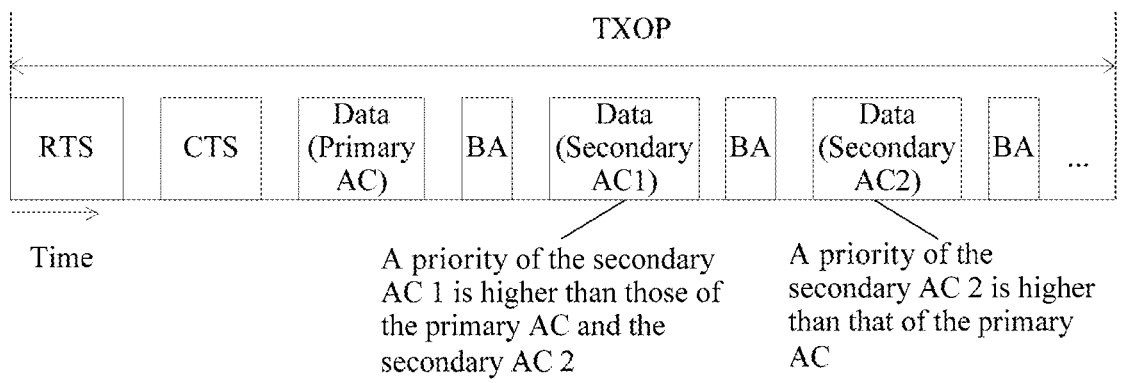
FIG. 7 is a third schematic data transmission diagram according to an embodiment of the present invention.

Optionally, S302 may specifically include: The station determines a priority of each second secondary AC in the second secondary AC group, and sequentially transmits data of the second secondary ACs within the remaining time in descending order of the priorities of the second secondary ACs. For details, reference may be made to a third schematic data transmission diagram shown in FIG. 7 (both a secondary AC 1 and a secondary AC 2 in FIG. 7 are second secondary ACs whose priorities are higher than that of a primary AC). After transmission of data of these second secondary ACs is completed, the station releases a channel resource.

In conclusion, in the two possible implementations of the first embodiment, priorities of secondary ACs are determined, and data of the secondary ACs is transmitted within the remaining time in the TXOP according to the priorities of the secondary ACs. In this way, fairness and reliability of data transmission can be ensured, and data transmission efficiency of the station can be further improved.

In all the following several embodiments, the following is described: Data of ACs is aggregated within a current TXOP, so that aggregated data is transmitted within the TXOP, thereby improving data transmission efficiency of the station. An efficiency improvement herein depends on two aspects.

First, data of multiple ACs is aggregated. Compared with separate transmission of data of all ACs, this manner can reduce overheads of inter-frame spacings, multiple acknowledgment frames, and multiple preambles (preamble) that are corresponding to many times of transmission. For example, referring to FIG. 3, during many times of data transmission within the TXOP, there are multiple acknowledgment frames (BA) and multiple inter-frame spacings. This surely wastes time in the current TXOP. In the following several embodiments, aggregation of data of ACs may be aggregation of data of a primary AC and data of a secondary AC, may be aggregation of data of secondary ACs, or may be aggregation of data corresponding to different TIDs in a primary AC or data corresponding to different TIDs in a secondary AC (for prior-art transmission, only data corresponding to one TID in an AC can be transmitted during one-time transmission, where the AC includes two traffic identifiers (Traffic Identifier, TID for short), and the TID indicates a priority of stored data corresponding to the AC). For any type of aggregation, quantities of acknowledgment frames and inter-frame spacings can be reduced, thereby improving data transmission efficiency of the station.

Second, during a multi-user transmission process (that is, multiple non-AP stations transmit data to an AP), time alignment of data of multiple users is required. When time alignment of data transmission is not implemented, padding (padding) needs to be performed for a station with a shorter transmission time period, so as to implement time alignment. Specifically, during a transmission process, a station can transmit only data of one AC. Assuming that data of a current AC of a station has a longer length, and data of a current AC of another station has a shorter length, to end transmission simultaneously, padding needs to be performed on the data of the station that has the shorter length, but the padding herein surely wastes partial time of the current TXOP. In contrast, if aggregation of data of ACs is performed, during one-time transmission, for an AC corresponding to data with a shorter length, data of other ACs may be aggregated, so that a padding length is reduced, thereby improving data transmission efficiency.

Figure 8:
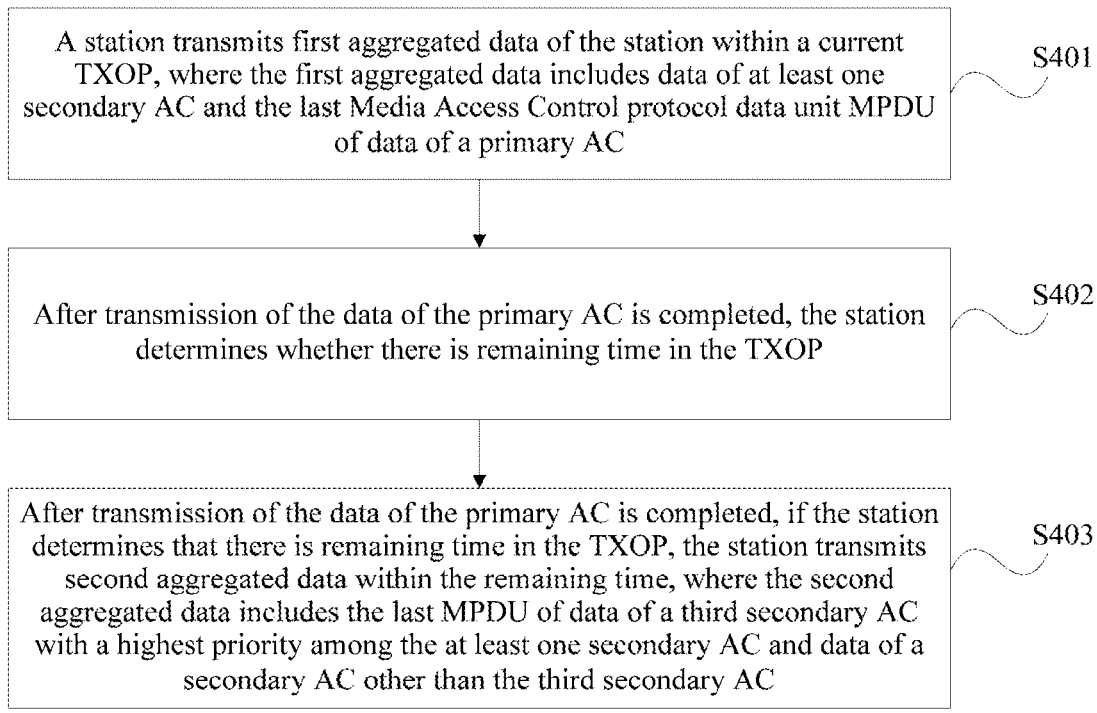
FIG. 8 is a schematic flowchart of a second data transmission method embodiment according to an embodiment of the present invention.

FIG. 8 is a schematic flowchart of a second data transmission method embodiment according to an embodiment of the present invention. This embodiment provides the following specific process: During transmission of data of a primary AC and a corresponding secondary AC within a TXOP, data of multiple ACs may be aggregated, so as to improve data transmission efficiency of a station. As shown in FIG. 8, the method includes the following steps.

S401. The station transmits first aggregated data of the station within a current TXOP, where the first aggregated data includes data of at least one secondary AC and the last Media Access Control protocol data unit MPDU of data of a primary AC.

Specifically, for each data transmission of the station, a length of aggregated data of the station is limited. A length of aggregated data during each transmission cannot exceed an allowed maximum transmission length. In addition, when aggregation of data of multiple ACs is allowed, the data of the primary AC needs to be first aggregated, and then the data of the secondary AC is aggregated. In a current standard, aggregated data is obtained by means of aggregation in an A-MPDU form and in a unit of MPDU.

Figure 9:
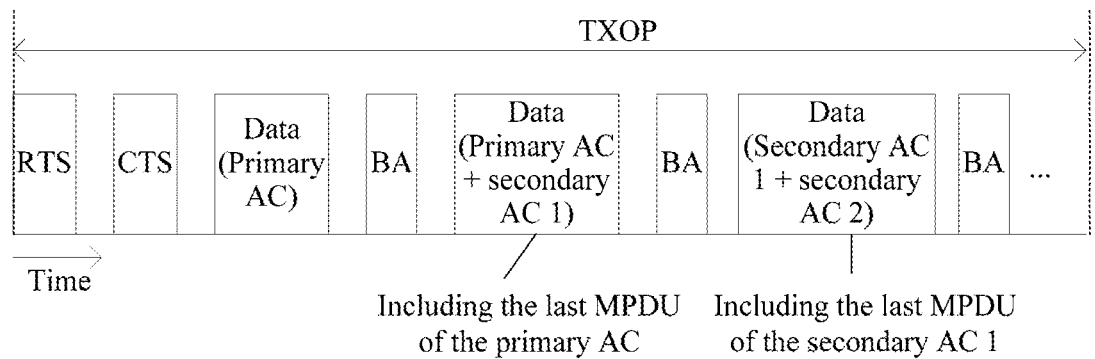
FIG. 9 is a fourth schematic data transmission diagram according to an embodiment of the present invention.

Referring to a fourth schematic data transmission diagram shown in FIG. 9. In FIG. 9, during first transmission by the station, transmission of data of a primary AC is not completed; during second transmission, it is assumed that a length of remaining data of the primary AC does not reach a maximum transmission length allowed by the station. Therefore, the remaining data of the primary AC and data of one or more secondary ACs can be aggregated to obtain first aggregated data. It should be noted that, the first aggregated data may include data of at least one secondary AC and the last Media Access Control protocol data unit (MPDU) of the data of the primary AC. The first aggregated data includes the last MPDU of the data of the primary AC, to ensure that aggregation and transmission of the data of the primary AC are completed during the second transmission. The first aggregated data shown in FIG. 9 includes the remaining data of the primary AC and some data of a secondary AC 1. However, the present invention is not limited thereto herein. That is, after the remaining data of the primary AC and the data of the secondary AC 1 are aggregated, if the maximum transmission length allowed by the station is still not reached, data of other secondary ACs may continue to be aggregated, and so on, to obtain the first aggregated data. Optionally, when a sum of lengths of all the data of the primary AC does not reach the maximum transmission length allowed by the station, data of a secondary AC can be aggregated during the first transmission.

Optionally, that the last MPDU of the data of the primary AC is included in the first aggregated data may be understood, from a more detailed perspective, as that the last MPDU of data corresponding to two TIDs in the primary AC is included. In addition, after aggregation of the data of the primary AC is completed, data corresponding to a higher-priority TID in a secondary AC may be preferentially aggregated during aggregation of data of the secondary AC. Optionally, during aggregation of the data of the primary AC and data of a secondary AC, data of a secondary AC with a higher priority may be first aggregated. If a length of aggregated data still does not reach the maximum transmission length allowed by the station, data of a secondary AC with a lower priority may continue to be aggregated. Certainly, regardless of aggregating data of a secondary AC with a higher priority or aggregating data of a secondary AC with a lower priority, data corresponding to a higher-priority TID of a current secondary AC may be first aggregated during aggregation.

After the station transmits the first aggregated data within the current TXOP, because the first aggregated data includes the last MPDU of the data of the primary AC, it indicates that the station completes transmission of all of the data of the primary AC within the current TXOP.

S402. After transmission of the data of the primary AC is completed, the station determines whether there is remaining time in the TXOP.

In this step, it should be noted that, that after transmission of the data of the primary AC is completed, the station determines whether there is remaining time in the current TXOP is specifically: After transmission of the first aggregated data is completed, the station determines whether there is still remaining time in the current TXOP.

S403. After transmission of the data of the primary AC is completed, if the station determines that there is remaining time in the TXOP, the station transmits second aggregated data within the remaining time, where the second aggregated data includes the last MPDU of data of a third secondary AC with a highest priority among the at least one secondary AC and data of a secondary AC other than the third secondary AC.

Specifically, after transmission of the first aggregated data is completed, if the station determines that there is still remaining time in the TXOP, the station may transmit the second aggregated data within the remaining time. Optionally, during aggregation for obtaining the second aggregated data, the station may aggregate data of any two secondary ACs according to the maximum transmission length allowed by the station, and then transmit the aggregated data. The second aggregated data obtained by means of aggregation needs to include the last MPDU of data of at least one secondary AC, or it is understood, from a more detailed perspective, that the second aggregated data includes the last MPDU of data corresponding to two TIDs in the at least one secondary AC. In FIG. 9, the secondary AC 1 has a highest priority among all secondary ACs, and a priority of a secondary AC 2 is lower than that of the secondary AC 1.

Optionally, the station may alternatively determine a priority sequence of current remaining secondary ACs, and perform data aggregation in a descending priority sequence according to the maximum transmission length allowed by the station. The second aggregated data obtained in this manner needs to include the last MPDU of data of a third secondary AC with a highest priority, or it is understood, from a more detailed perspective, that the second aggregated data includes the last MPDU of data corresponding to two TIDs in the third secondary AC. Optionally, the station may aggregate the data of the third secondary AC and data of a secondary AC other than the third secondary AC according to the maximum transmission length allowed by the station. Herein, during aggregation of the data of the third secondary AC and the data of the other secondary ACs, data of the third secondary AC and other secondary ACs with any priority may be aggregated, or data aggregation may be performed according to the priority sequence of the other secondary ACs. Optionally, during aggregation of the data of the other secondary ACs, data corresponding to higher-priority TIDs in the secondary ACs may be first aggregated.

Alternatively, S403 may further be: transmitting, by the station, third aggregated data within the remaining time, where the third aggregated data includes the last MPDU of data corresponding to a higher-priority TID in the secondary AC and at least one MPDU of data corresponding to a lower-priority TID in the secondary AC.

Specifically, the station may alternatively aggregate data corresponding to different TIDs in a secondary AC, that is, a length of data of the secondary AC exceeds the maximum transmission length allowed by the station. In this case, during aggregation, the station may preferentially aggregate data corresponding to a higher-priority TID in the secondary AC, and then aggregate data corresponding to a lower-priority TID in the secondary AC. During one transmission, to ensure that transmission of all the data corresponding to the higher-priority TID is completed, the obtained third aggregated data needs to include the last MPDU of data corresponding to a higher-priority TID in the secondary AC and at least one MPDU of data corresponding to a lower-priority TID in the AC. It should be noted that, the aggregation manner is also applicable to the primary AC. That is, when a length of the data of the primary AC exceeds the maximum transmission length allowed by the station, during aggregation, the station may preferentially aggregate data corresponding to a higher-priority TID in the primary AC, and then aggregate data corresponding to a lower-priority TID in the primary AC.

In conclusion, according to the data transmission method provided in this embodiment of the present invention, data of one or more ACs is aggregated and transmitted. Therefore, quantities of to-be-transmitted acknowledgment frames and inter-frame spacings within the current TXOP are reduced, so that the station can transmit the data of the one or more ACs to the utmost within the current TXOP, thereby improving data transmission efficiency of the station and reducing channel resources.

Figure 10:
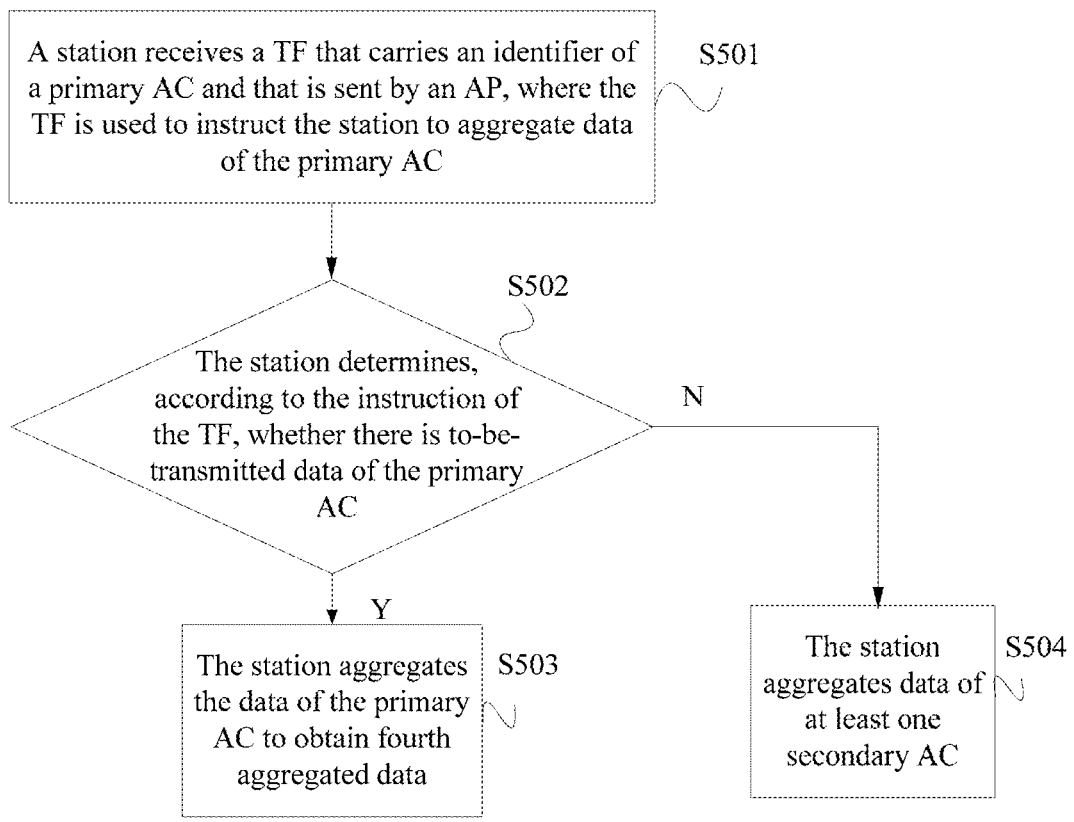
FIG. 10 is a schematic flowchart of a third data transmission method embodiment according to an embodiment of the present invention.

FIG. 10 is a schematic flowchart of a third data transmission method embodiment according to an embodiment of the present invention. In this embodiment, a station is a non-AP station. This embodiment provides a specific process in which multiple non-AP stations perform multi-user uplink transmission according to a trigger fram (TF) delivered by an AP. Herein, multi-user uplink transmission may be performed in an orthogonal frequency division multiple access (OFDMA) or multi-user multiple-input multiple-output (MU-MIMO) mode. It should be noted that, the foregoing process is an execution process of a non-AP station. Execution processes of all non-AP stations are the same. In this embodiment, a TF carries an identifier of one AC.

Based on the embodiment shown in FIG. 2, before S101, the method may further include the following steps.

S501. The station receives a trigger frame (TF) that carries an identifier of the primary AC and that is sent by an AP, where the TF is used to instruct the station to aggregate the data of the primary AC.

In this embodiment, it should be understood that, the AP includes identifiers of multiple ACs, and the station also includes the identifiers of the multiple ACs. The existing IEEE 802.11 standard is used as an example. Identifiers of multiple ACs of the AP are AC_VO, AC_Vi, AC_BE, and AC_BK, respectively. The identifiers of the multiple ACs of the station are also AC_VO, AC_Vi, AC_BE, and AC_BK, respectively.

Specifically, the AP sends a TF to the station for the first time, where the TF carries the identifier of the primary AC, to inform the station (that is, the non-AP station) that data of the AC with this identifier needs to be aggregated currently. For example, assuming that the identifier of the primary AC carried in the TF sent for the first time is AC_VO, it means informing the non-AP station that data of an AC with AC_VO of the non-AP station needs to be aggregated currently.

S502. The station determines, according to the instruction of the TF, whether there is to-be-transmitted data of the primary AC. If there is to-be-transmitted data of the primary AC, S503 is performed; if there is no to-be-transmitted data of the primary AC, S504 is performed.

S503. If there is to-be-transmitted data of the primary AC, the station aggregates the data of the primary AC to obtain fourth aggregated data.

S101 may be specifically: sending, by the station, the fourth aggregated data to the AP within the TXOP.

Specifically, when determining, according to the instruction of the TF, that there is to-be-transmitted data of the primary AC, the station aggregates the data of the primary AC to obtain the fourth aggregated data. Optionally, the fourth aggregated data includes data of at least one secondary AC and the last MPDU of the data of the primary AC. Optionally, assuming that a sum of lengths of all the data of the primary AC of the station is equal to an allowed maximum transmission length, the fourth aggregated data may include other data of the primary AC and the last MPDU of the data of the primary AC. Optionally, assuming that a sum of lengths of all the data of the primary AC of the station exceeds an allowed maximum transmission length, the fourth aggregated data may include the last MPDU of data corresponding to a higher-priority TID in the primary AC and at least one MPDU of data corresponding to a lower-priority TID in the primary AC. In addition, for remaining data corresponding to the lower-priority TID in the primary AC, the station may aggregate the remaining data corresponding to the lower-priority TID and the data of the other secondary ACs. For a specific data aggregation manner, reference may be made to the description in the foregoing second embodiment. Details are not described herein again.

In addition, it should be noted that, a TF delivered by the AP each time is corresponding to one uplink transmission of the station. For uplink transmission corresponding to a TF delivered by the AP for any one time, in all aggregated data transmitted by each station, when at least one piece of aggregated data is entirely composed of the data of the primary AC, the current uplink transmission is used to instruct the AP to continue instructing, in a TF delivered next time, the station to continue aggregating the data of the primary AC during next uplink transmission. That is, in all aggregated data transmitted by each station, when at least one piece of aggregated data is entirely composed of the data of the primary AC, it is equivalent to instructing the AP to continue adding an identifier of the current primary AC to a TF delivered next time. Optionally, all the aggregated data transmitted by each station includes indication fields, where the indication field may indicate whether there is to-be-transmitted data of an AC of the station. For uplink transmission corresponding to a TF delivered by the AP for any one time, in all the aggregated data transmitted by each station, when at least one piece of aggregated data is entirely composed of the data of the primary AC and an indication field in the aggregated data is 1 (herein, the indication field 1 indicates that there is still to-be-transmitted data of the primary AC of the AP), the indication field is used to instruct the AP to continue adding the identifier of the primary AC to a TF delivered next time, so that the station continues aggregating the data of the primary AC during next uplink transmission. During the next uplink transmission, if a length of the data of the primary AC does not reach the allowed maximum transmission length, data of other secondary ACs may continue to be aggregated after aggregation of the last MPDU of the primary AC is completed. For a specific data aggregation manner, reference may be made to the description in the foregoing second embodiment. Details are not described herein again. Optionally, the indication field may be a more data field.

Optionally, for uplink transmission corresponding to a TF delivered by the AP for any one time, when all aggregated data transmitted by each station includes data of a secondary AC, the current uplink transmission is used to instruct the AP to instruct, in a TF delivered next time, the station to aggregate data of a secondary AC during next uplink transmission. That is, when all aggregated data transmitted by each station includes data of a secondary AC, it is equivalent to instructing the AP to add an identifier of a secondary AC to a TF delivered next time, so that the station can aggregate the data of the secondary AC during next uplink transmission. Optionally, all the aggregated data transmitted by each station includes indication fields, where the indication field may indicate whether there is to-be-transmitted data of an AC of the station. For uplink transmission corresponding to a TF delivered by the AP for any one time, when all indication fields in aggregated data, including the data of the primary AC, of all the aggregated data transmitted by each station are 0 (herein, the indication field 0 indicates that there is no to-be-transmitted data of the primary AC of the AP), the indication field is used to instruct the AP to continue adding an identifier of a secondary AC to a TF delivered next time, so that the station aggregates data of the secondary AC during next uplink transmission. During the next uplink transmission, if a length of the data of the secondary AC does not reach the allowed maximum transmission length, data of other secondary ACs may continue to be aggregated after aggregation of the last MPDU of the secondary AC is completed. For a specific data aggregation manner, reference may be made to the description in the foregoing second embodiment. Details are not described herein again. Optionally, the indication field may be a more data field.

Optionally, the indication field may be used to instruct the AP to instruct, in a TF delivered next time, the station to aggregate, during next uplink transmission, data of a secondary AC whose priority is higher than that of the primary AC. That is, the indication field is used to instruct the AP to add, to the TF delivered next time, an identifier of the secondary AC whose priority is higher than that of the primary AC, so that the station can aggregate the data of the secondary AC during the next uplink transmission. During the next uplink transmission, if a length of the data of the secondary AC does not reach the allowed maximum transmission length, data of other secondary ACs may continue to be aggregated after aggregation of the last MPDU of the secondary AC is completed. For a specific data aggregation manner, reference may be made to the description in the foregoing second embodiment. Details are not described herein again.

Optionally, the indication field may be used to instruct the AP to instruct, in a TF delivered next time, the station to aggregate data of a secondary AC with a highest priority during next uplink transmission. That is, the indication field is used to instruct the AP to add an identifier of the secondary AC with a highest priority to the TF delivered next time, so that the station can aggregate the data of the secondary AC during the next uplink transmission. During the next uplink transmission, if a length of the data of the secondary AC does not reach the allowed maximum transmission length, data of other secondary ACs may continue to be aggregated after aggregation of the last MPDU of the secondary AC is completed. For a specific data aggregation manner, reference may be made to the description in the foregoing second embodiment. Details are not described herein again.

S504. The station aggregates the data of the at least one secondary AC.

Optionally, when the station determines, according to the instruction of the TF, that there is no to-be-transmitted data of the primary AC, the station may aggregate data of any one or more of the secondary ACs, aggregate data of a secondary AC whose priority is higher than that of the primary AC and data of other secondary ACs, or aggregate data of a secondary AC with a highest priority among the at least one secondary AC and data of other secondary ACs. For a specific data aggregation manner, reference may be made to the description in the foregoing second embodiment. Details are not described herein again.

According to the data transmission method provided in this embodiment of the present invention, a multi-user uplink transmission scenario is described: Within the current TXOP, each non-AP station may determine, according to the TF from the AP, a type of an AC that is to be aggregated during next uplink transmission, aggregate data of the AC of the corresponding type, and transmit, to the AP, aggregated data obtained by means of aggregation. In this way, time of the TXOP is utilized more fully, and quantities of to-be-transmitted acknowledgment frames and inter-frame spacings are reduced by means of data aggregation, thereby reducing channel resources and improving data transmission efficiency of the station.

Figure 11:
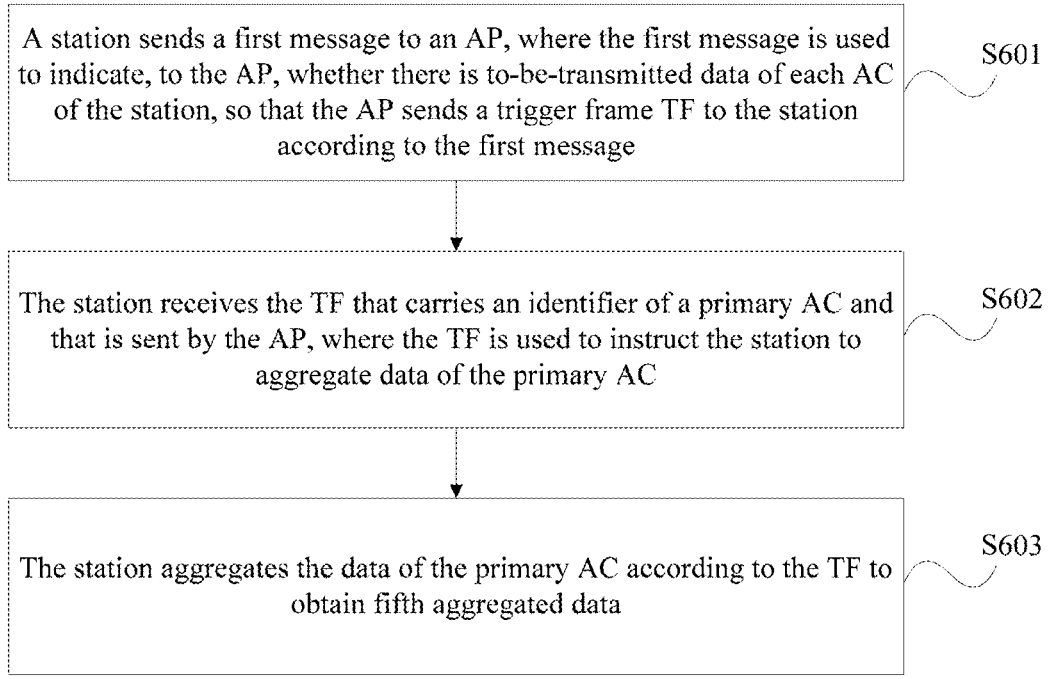
FIG. 11 is a schematic flowchart of a fourth data transmission method embodiment according to an embodiment of the present invention.

FIG. 11 is a schematic flowchart of a fourth data transmission method embodiment according to an embodiment of the present invention. In this embodiment, a station is a non-AP station. This embodiment provides a specific process in which multiple non-AP stations perform multi-user uplink transmission according to a TF delivered by an AP. It should be noted that, similar to FIG. 10, the foregoing process is an execution process of a non-AP station. Execution processes of all non-AP stations are the same. In this embodiment, the TF may carry an identifier of an AC, or may carry identifiers of multiple ACs.

Based on the embodiment shown in FIG. 2, before S101, the method may further include the following steps.

S601. The station sends a first message to an AP, where the first message is used to indicate, to the AP, whether there is to-be-transmitted data of each AC of the station, so that the AP sends a trigger frame TF to the station according to the first message.

Specifically, each station sends the first message to the AP, to inform the AP of a status of temporarily stored data of ACs of the station, that is, inform the AP that there is to-be-transmitted data of a specific AC of the station and there is no to-be-transmitted data of a specific AC of the station currently. Optionally, each station may further inform the AP of sizes and priorities of temporarily stored data of all current ACs of the station, and the like.

S602. The station receives the TF that carries an identifier of the primary AC and that is sent by the AP, where the TF is used to instruct the station to aggregate the data of the primary AC.

Specifically, when receiving the first message sent by each station, the AP learns a status of to-be-transmitted data of each AC of the station, determines, according to the status, an AC with a specific identifier for which a TXOP is contended, uses the AC with the identifier as the primary AC, adds the identifier of the primary AC to the TF, and sends the TF to each station, so that the station aggregates the data of the AC, corresponding to the identifier, of the station according to the identifier of the primary AC in the TF. For example, it is assumed that there are two stations. Both the two stations indicate the following to the AP by using the first message: for the stations, there is to-be-transmitted data of AC_VO, there is to-be-transmitted data of AC_Vi, there is no to-be-transmitted data of AC_BE, and there is no to-be-transmitted data of AC_BK. In this case, the AP contends for a TXOP for AC_VO according to the two first messages, and uses AC_VO as the primary AC. Therefore, the AP may add AC_VO (AC_VO is an identifier actually) to the TF, and send the TF to the two stations, so that the two stations can aggregate data of AC_VO of the two stations. In other words, when there is to-be-transmitted data of an AC of each station, the AP may contend for a TXOP for the AC, use the AC as the primary AC, and add an identifier of the AC to the TF, so as to instruct the station to aggregate data of the primary AC. Optionally, when there is to-be-transmitted data of an AC of some stations and there is no to-be-transmitted data of the AC of other stations, the AP may contend for a TXOP for the AC, use the AC as the primary AC, and add an identifier of the AC and identifiers of other secondary ACs to the TF, so as to instruct the station to aggregate data of the primary AC and data of the secondary ACs. There may be one or more identifiers, and each the secondary AC is corresponding to one identifier.

S603. The station aggregates the data of the primary AC according to the TF to obtain fifth aggregated data.

S101 may be specifically: sending, by the station, the fifth aggregated data to the AP within the TXOP.

It is assumed that the TF carries only the identifier of the primary AC. If a length of the data of the primary AC does not reach an allowed maximum transmission length, data of other secondary ACs may continue to be aggregated after aggregation of the last MPDU of the primary AC is completed, to obtain the fifth aggregated data. If a length of the data of the primary AC exceeds an allowed maximum transmission length, the station may first aggregate data corresponding to a higher-priority TID in the primary AC, and then aggregate data corresponding to a lower-priority TID in the primary AC, to obtain the fifth aggregated data. In addition, for remaining data corresponding to the lower-priority TID in the primary AC, the station may aggregate the remaining data corresponding to the lower-priority TID and the data of the other secondary ACs. For a specific data aggregation manner, reference may be made to the description in the foregoing second embodiment. Details are not described herein again.

It is assumed that the TF carries the identifier of the primary AC and an identifier of any secondary AC. If a sum of lengths of the data of the primary AC and data of the any secondary AC does not reach the allowed maximum transmission length, data of other secondary ACs may continue to be aggregated after aggregation of the data of these ACs is completed, to obtain the fifth aggregated data. For a specific data aggregation manner, reference may be made to the description in the foregoing second embodiment. Details are not described herein again.

In other words, the fifth aggregated data may include data of at least one secondary AC and the last MPDU of the data of the primary AC. Optionally, assuming that a sum of lengths of all the data of the primary AC of the station is equal to the allowed maximum transmission length, the fifth aggregated data may include other data of the primary AC and the last MPDU of the data of the primary AC. Optionally, assuming that a sum of lengths of all the data of the primary AC of the station exceeds the allowed maximum transmission length, the fifth aggregated data may include the last MPDU of data corresponding to a higher-priority TID in the primary AC and at least one MPDU of data corresponding to a lower-priority TID in the primary AC.

In addition, it should be noted that, a TF delivered by the AP each time is corresponding to one uplink transmission of the station. Optionally, all aggregated data transmitted by each station may include an indication field. The indication field may indicate whether there is to-be-transmitted data of an AC of the station. An indication field 1 indicates that there is to-be-transmitted data of an AC of the station, and an indication field 0 indicates that there is no to-be-transmitted data of an AC of the station. Certainly, interchange of meanings of values 0 and 1 of an indication field may also be applicable to the solutions in this patent. When one piece of aggregated data includes data of multiple ACs, multiple indication fields may be included. Each indication field is used to indicate whether there is to-be-transmitted data of a corresponding AC. For example, an indication field 0 is corresponding to an AC 0, and an indication field 1 is corresponding to an AC 1. This indicates that there is no to-be-transmitted data of the AC 0 of the station and there is to-be-transmitted data of the AC 1 of the station.

For uplink transmission corresponding to a TF delivered by the AP for any one time, when all the aggregated data transmitted by each station is entirely composed of the data of the primary AC and indication fields in all the aggregated data are 1 (herein, the indication field 1 indicates that there is still to-be-transmitted data of the primary AC of each station), the current uplink transmission is used to instruct the AP to continue instructing, in a TF delivered next time, the station to aggregate the data of the primary AC during next uplink transmission. That is, when all the aggregated data transmitted by each station is entirely composed of the data of the primary AC and indication fields in all the aggregated data are 1, it is equivalent to instructing the AP to continue adding the identifier of the current primary AC to a TF delivered next time. Optionally, all the aggregated data transmitted by each station may alternatively not include the indication field. In this case, for uplink transmission corresponding to a TF delivered by the AP for any one time, when all the aggregated data transmitted by each station is entirely composed on the data of the primary AC, it is equivalent to instructing the AP to continue adding the identifier of the current primary AC to a TF delivered next time, so that the station can continue aggregating the data of the primary AC during next uplink transmission. For a specific data aggregation manner, reference may be made to the description in the foregoing second embodiment. Details are not described herein again.

Optionally, for uplink transmission corresponding to a TF delivered by the AP for any one time, in all the aggregated data transmitted by each station, when at least one piece of aggregated data includes the data of the primary AC and an indication field in the aggregated data including the data of the primary AC is 0 (herein, the indication field 0 indicates that there is no to-be-transmitted data of a primary AC of a station), and when at least one piece of aggregated data includes the data of the primary AC and an indication field in the aggregated data including the data of the primary AC is 1 (herein, the indication field 1 indicates that there is still to-be-transmitted data of a primary AC of another station), the current uplink transmission is used to instruct the AP to instruct, in a TF delivered next time, the station to continue aggregating the data of the primary AC or aggregate the data of the primary AC and data of a secondary AC during next uplink transmission. In other words, in all the aggregated data transmitted by each station, when at least one piece of aggregated data includes the data of the primary AC and an indication field in the aggregated data including the data of the primary AC is 0, and when at least one piece of aggregated data includes the data of the primary AC and an indication field in the aggregated data including the data of the primary AC is 1, it is equivalent to instructing the AP to continue adding the identifier of the current primary AC or the identifier of the current primary AC and an identifier of any secondary AC (the any secondary AC is a secondary AC, corresponding to to-be-transmitted data, of the STA) to a TF delivered next time, so that the station aggregates the data of the primary AC or aggregates the data of the primary AC and data of the secondary AC during next uplink transmission. For a specific data aggregation manner, reference may be made to the description in the foregoing second embodiment. Details are not described herein again.

Optionally, for uplink transmission corresponding to a TF delivered by the AP for any one time, in all the aggregated data transmitted by each station, when at least one piece of aggregated data does not include the data of the primary AC, and when at least one piece of aggregated data includes the data of the primary AC and an indication field in the aggregated data including the data of the primary AC is 1 (herein, the indication field 1 indicates that there is still to-be-transmitted data of a primary AC of a station), the current uplink transmission is used to instruct the AP to instruct, in a TF delivered next time, the station to continue aggregating the data of the primary AC or aggregating the data of the primary AC and data of a secondary AC during next uplink transmission. In other words, in all the aggregated data transmitted by each station, when at least one piece of aggregated data does not include the data of the primary AC, and when at least one piece of aggregated data includes the data of the primary AC and an indication field in the aggregated data including the data of the primary AC is 1, it is equivalent to instructing the AP to continue adding the identifier of the primary AC or the identifier of the primary AC and an identifier of any secondary AC (the any secondary AC is a secondary AC, corresponding to to-be-transmitted data, of the STA) to a TF delivered next time, so that the station aggregates the data of the primary AC or aggregates the data of the primary AC and data of the secondary AC during next uplink transmission. For a specific data aggregation manner, reference may be made to the description in the foregoing second embodiment. Details are not described herein again.

Optionally, for uplink transmission corresponding to a TF delivered by the AP for any one time, in all the aggregated data transmitted by each station, when at least one piece of aggregated data includes the data of the primary AC and an indication field in the aggregated data including the data of the primary AC is 0 (herein, the indication field 0 indicates that there is no to-be-transmitted data of a primary AC of a station), or when none of the aggregated data includes the data of the primary AC, the current uplink transmission is used to instruct the AP to instruct, in a TF delivered next time, the station to aggregate data of a secondary AC during next uplink transmission. In other words, in all the aggregated data transmitted by each station, when at least one piece of aggregated data includes the data of the primary AC and an indication field in the aggregated data including the data of the primary AC is 0, or when none of the aggregated data includes the data of the primary AC, it is equivalent to instructing the AP to add an identifier of any secondary AC (the any secondary AC is a secondary AC, corresponding to to-be-transmitted data, of the STA) to a TF delivered next time, so that the station aggregates data of the secondary AC during next uplink transmission. For a specific data aggregation manner, reference may be made to the description in the foregoing second embodiment. Details are not described herein again.

When none of the aggregated data transmitted by each station includes an indication field, alternatively, the AP may be instructed to add an identifier of a corresponding AC to a delivered TF. For details, reference may be made to the following several optional manners.

Optionally, for uplink transmission corresponding to a TF delivered by the AP for any one time, in all the aggregated data transmitted by each station, when at least one piece of aggregated data is entirely composed of the data of the primary AC and at least one piece of aggregated data includes data of a secondary AC, the current uplink transmission is used to instruct the AP to instruct, in a TF delivered next time, the station to aggregate the data of the primary AC and data of a secondary AC during next uplink transmission. In other words, in all the aggregated data transmitted by each station, when at least one piece of aggregated data is entirely composed of the data of the primary AC and at least one piece of aggregated data includes data of a secondary AC, it is equivalent to instructing the AP to add the identifier of the primary AC and an identifier of any secondary AC (the any secondary AC is a secondary AC, corresponding to to-be-transmitted data, of the STA) to a TF delivered next time, so that the station aggregates the data of the primary AC and data of the secondary AC during next uplink transmission. For a specific data aggregation manner, reference may be made to the description in the foregoing second embodiment. Details are not described herein again.

Optionally, for uplink transmission corresponding to a TF delivered by the AP for any one time, when all the aggregated data transmitted by each station includes data of a secondary AC, the current uplink transmission is used to instruct the AP to instruct, in a TF delivered next time, the station to aggregate data of one or more secondary ACs during next uplink transmission. In other words, when all the aggregated data transmitted by each station includes data of a secondary AC, it is equivalent to instructing the AP to add identifiers of one or more secondary ACs (the secondary AC is a secondary AC, corresponding to to-be-transmitted data, of the STA) to a TF delivered next time, so that the station aggregates data of the one or more secondary ACs during next uplink transmission. For a specific data aggregation manner, reference may be made to the description in the foregoing second embodiment. Details are not described herein again.

According to the data transmission method provided in this embodiment of the present invention, a multi-user uplink transmission scenario is described: Within the current TXOP, each non-AP station may determine, according to the TF from the AP, a type of an AC that is to be aggregated during next uplink transmission, aggregate data of the AC of the corresponding type, and transmit, to the AP, aggregated data obtained by means of aggregation. In this way, time of the TXOP is utilized more fully, and quantities of to-be-transmitted acknowledgment frames and inter-frame spacings are reduced by means of data aggregation, thereby reducing channel resources and improving data transmission efficiency of the station.

An embodiment of the present invention provides a data transmission method. In this embodiment, a station is an AP. This embodiment provides an aggregation process of data of multiple ACs of the AP during multi-user downlink transmission. During multi-user downlink transmission, an AP transmits data to multiple non-AP stations. Time alignment is required during the transmission, that is, it is required that transmission should be started simultaneously and ended simultaneously. In this embodiment, the data transmitted by the AP to all the non-AP stations may be aggregated data. During one multi-user downlink transmission, the aggregated data that is simultaneously transmitted is grouped into an aggregation data unit. The station transmits one or more aggregation data units within a current TXOP. Each aggregation data unit includes one or more pieces of aggregated data that is simultaneously transmitted.

It should be noted that, each AC of the AP may be corresponding to different temporarily stored data of a non-AP station. A non-AP station is used as an example.

It is assumed that both a primary AC and a secondary AC of the AP are corresponding to temporarily stored data of the non-AP station. Before sending aggregated data to the non-AP station, the AP first aggregates data of the non-AP station that is temporarily stored by the AP and that is corresponding to the primary AC. When a length of the aggregated data does not reach an allowed maximum transmission length, the AP then aggregates data of the non-AP station that is temporarily stored by the AP and that is corresponding to the secondary AC. In other words, before the AP sends aggregated data to the non-AP station, during aggregation of data of the primary AC and the secondary AC, the aggregated data needs to include the last MPDU of the temporarily stored data, corresponding to the primary AC, of the non-AP station.

It is assumed that only the primary AC of the AP is corresponding to temporarily stored data of the non-AP station. Before sending the aggregated data to the non-AP station, the AP may sequentially aggregate temporarily stored data, corresponding to a higher-priority TID and a lower-priority TID in the primary AC, of the non-AP station.

Assuming that the primary AC of the AP is not corresponding to temporarily stored data of the non-AP station but the secondary AC is corresponding to temporarily stored data of the non-AP station, there are two cases when the AP sends the aggregated data to the non-AP station. A first case is: If a length of the data of the secondary AC is equal to the allowed maximum transmission length, before sending the aggregated data to the non-AP station, the AP may sequentially aggregate temporarily stored data, corresponding to a higher-priority TID and a lower-priority TID in the secondary AC, of the non-AP station. That is, when data aggregation is performed for a secondary AC, aggregated data needs to include the last MPDU of the temporarily stored data, corresponding to the higher-priority TID in the secondary AC of the AP, of the non-AP station. A second case is: If a length of the data of the secondary AC is not equal to the allowed maximum transmission length, before sending the aggregated data to the non-AP station, the AP may first aggregate the temporarily stored data, corresponding to the secondary AC, of the non-AP station; and when a length of the aggregated data does not reach the allowed maximum transmission length, the AP aggregates data of the non-AP station that is temporarily stored by the AP and that is corresponding to other secondary ACs. That is, before the AP sends aggregated data to the non-AP station, during aggregation of data of the secondary AC, the aggregated data includes the last MPDU of temporarily stored data, corresponding to any secondary AC, of the non-AP station.

For one downlink transmission performed by the AP, aggregated data of multiple stations form an aggregation data unit. When the aggregation data unit includes one or more sixth aggregated data entirely composed of the data of the primary AC, both a length of seventh aggregated data and a length of eighth aggregated data are not greater than a length of the sixth aggregated data. The seventh aggregated data in the aggregation data unit includes the data of the primary AC and the data of the at least one secondary AC, and the eighth aggregated data in the aggregation data unit is entirely composed of data of a secondary AC. The seventh aggregated data includes the last MPDU of the temporarily stored data, corresponding to the primary AC, of the non-AP station.

When the aggregation data unit does not include sixth aggregated data but includes one or more pieces of seventh aggregated data, a length of eighth aggregated data is not greater than a length of seventh aggregated data with a maximum length among all the seventh aggregated data.

When the aggregation data unit does not include sixth aggregated data and seventh aggregated data, a length of any other eighth aggregated data is not greater than a length of eighth aggregated data including data of a secondary AC with a highest priority among the at least one secondary AC.

Figure 12:
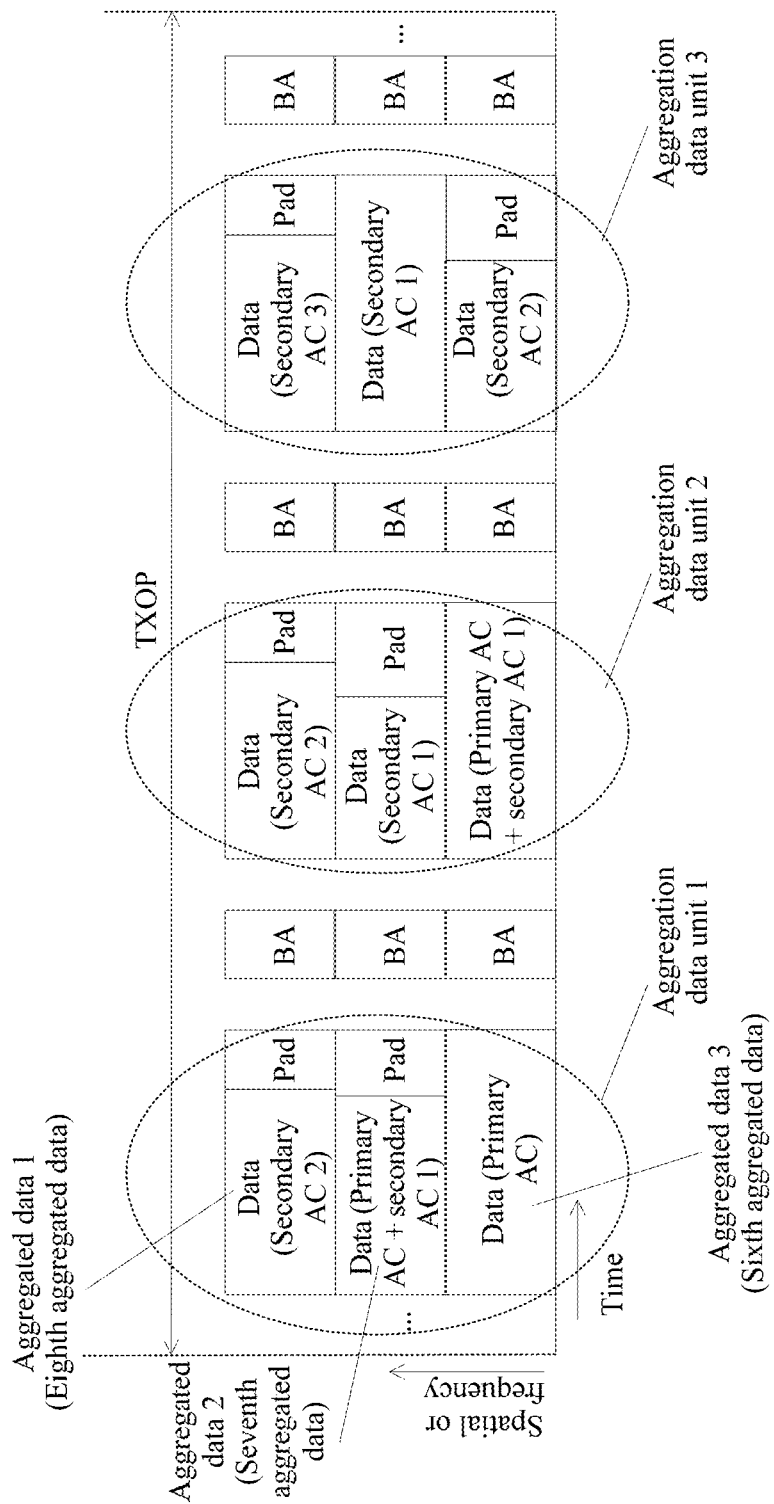
FIG. 12 is a fifth schematic data transmission diagram according to an embodiment of the present invention.

Referring to a fifth schematic data transmission diagram shown in FIG. 12, in the example, for an aggregation data unit 1, the aggregation data unit 1 includes three pieces of aggregated data, among which aggregated data 3 entirely composed of data of a primary AC is included. Each piece of aggregated data is corresponding to one non-AP station. Aggregated data 1 is eighth aggregated data, aggregated data 2 is seventh aggregated data, and the aggregated data 3 is sixth aggregated data. It can be learnt from FIG. 12 that, a length of the seventh aggregated data and a length of the eighth aggregated data are less than that of the sixth aggregated data. For an aggregation data unit 2, the aggregation data unit 2 includes three pieces of aggregated data and does not include sixth aggregated data; in this case, it can be learnt from FIG. 12 that, a length of eighth aggregated data is less than that of seventh aggregated data. For an aggregation data unit 3, a priority of a secondary AC 1 is the highest, and the aggregation data unit 3 does not include sixth aggregated data and seventh aggregated data and includes only eighth aggregated data; in this case, it can be learnt from FIG. 12 that, a length of any other eighth aggregated data is not greater than a length of eighth aggregated data including data of the secondary AC 1.

According to the data transmission method provided in this embodiment of the present invention, a multi-user downlink transmission scenario is described: Within the current TXOP, the AP may transmit corresponding aggregated data to multiple non-AP stations. In this way, time of the TXOP is utilized more fully, and quantities of to-be-transmitted acknowledgment frames and inter-frame spacings are reduced by means of data aggregation, thereby reducing channel resources and improving data transmission efficiency of the station.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 13:
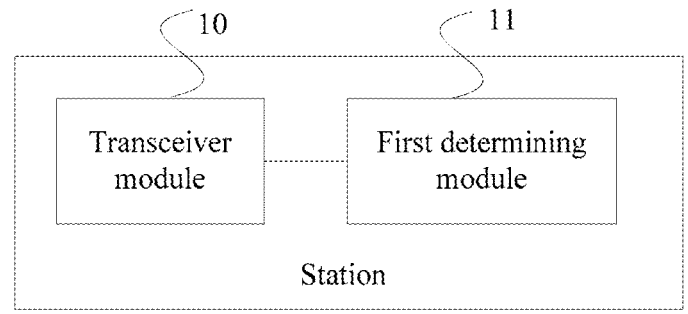
FIG. 13 is a schematic structural diagram of a first station embodiment according to an embodiment of the present invention.

FIG. 13 is a schematic structural diagram of a first station embodiment according to an embodiment of the present invention. Some or all of functions of a station shown in FIG. 13 may be implemented in a form of software, or may be implemented in a form of software and hardware. As shown in FIG. 13, the station may include a transceiver module 10 and a first determining module 11.

The transceiver module 10 is configured to transmit data of a primary AC of the station within a current transmission opportunity TXOP. To-be-transmitted data of the station includes the data of the primary AC and data of at least one secondary AC.

The first determining module 11 is configured to: after transmission of the data of the primary AC is completed, determine, by the station, whether there is remaining time in the TXOP.

The transceiver module 10 is further configured to: when the first determining module 11 determines that there is remaining time in the TXOP, transmit the data of the at least one secondary AC within the remaining time.

In FIG. 13, the transceiver module 10 may be a transceiver chip or a transceiver circuit having sending and receiving functions, or may be a transceiver chip or a transceiver circuit having sending and receiving functions and a partial processing function. The partial processing function includes functions such as modulation, demodulation, encoding, decoding, scrambling, and descrambling. The first determining module 11 may be a processor or a microprocessor to which a corresponding program having a processing function is loaded.

The station provided in this embodiment of the present invention can execute the first method embodiment. Implementation principles and technical effects thereof are similar to those of the first method embodiment, and details are not described herein again.

Optionally, that the transceiver module 10 is configured to transmit the data of the at least one secondary AC within the remaining time includes:

the transceiver module 10 is specifically configured to: determine a priority sequence of first secondary ACs in a first secondary AC group of the station; and sequentially transmit data of the first secondary ACs in the first secondary AC group within the remaining time in a descending priority sequence, where the first secondary AC group includes at least one first secondary AC, and the first secondary AC is a secondary AC that is corresponding to to-be-transmitted data.

Optionally, that the transceiver module 10 is configured to transmit the data of the at least one secondary AC within the remaining time includes:

the transceiver module 10 is specifically configured to: determine, from the at least one secondary AC, a second secondary AC group whose priority is higher than that of the primary AC; and transmit data of the second secondary AC group within the remaining time, where the second secondary AC group includes at least one second secondary AC, and the second secondary AC is a secondary AC that is corresponding to to-be-transmitted data. Further, that the transceiver module 10 is specifically configured to transmit the data of the second secondary AC group within the remaining time includes:

the transceiver module 10 is specifically configured to: determine a priority of each second secondary AC in the second secondary AC group; and sequentially transmit data of the second secondary ACs within the remaining time in descending order of the priorities of the second secondary ACs.

The station provided in this embodiment of the present invention can execute the two possible implementations in the first method embodiment. Implementation principles and technical effects thereof are similar to those of the first method embodiment, and details are not described herein again.

Optionally, that the transceiver module 10 is configured to transmit the data of the primary AC of the station within the current transmission opportunity TXOP includes: the transceiver module 10 is specifically configured to transmit first aggregated data of the station within the TXOP, where the first aggregated data includes the data of the at least one secondary AC and the last Media Access Control protocol data unit MPDU of the data of the primary AC.

That the transceiver module 10 is configured to transmit the data of the at least one secondary AC within the remaining time includes: the transceiver module 10 is specifically configured to transmit second aggregated data within the remaining time, where the second aggregated data includes the last MPDU of data of a third secondary AC with a highest priority among the at least one secondary AC and data of a secondary AC other than the third secondary AC.

Further, that the transceiver module 10 is configured to transmit the data of the at least one secondary AC within the remaining time includes: the transceiver module 10 is specifically configured to transmit third aggregated data within the remaining time, where the third aggregated data includes the last MPDU of data corresponding to a higher-priority traffic identifier TID in the secondary AC and at least one MPDU of data corresponding to a lower-priority TID in the secondary AC.

The station provided in this embodiment of the present invention can execute the second method embodiment. Implementation principles and technical effects thereof are similar to those of the second method embodiment, and details are not described herein again.

Figure 14:
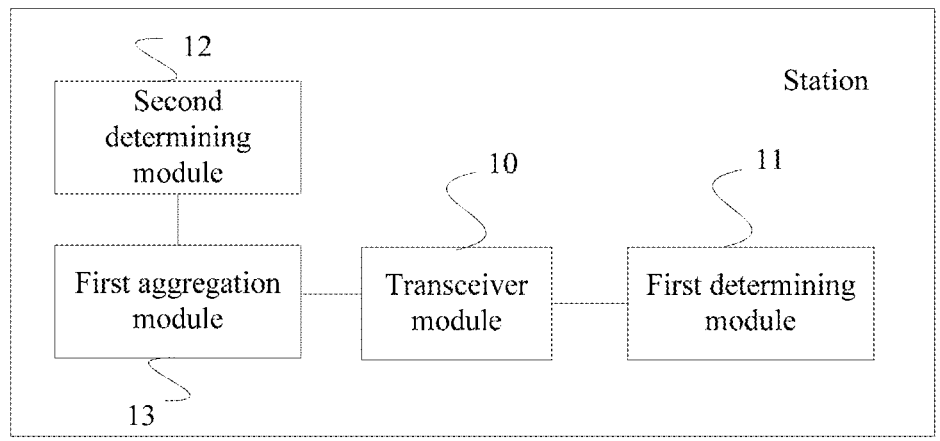
FIG. 14 is a schematic structural diagram of a second station embodiment according to an embodiment of the present invention.

FIG. 14 is a schematic structural diagram of a second station embodiment according to an embodiment of the present invention. Based on the embodiment shown in FIG. 13, the station may further include a second determining module 12 and a first aggregation module 13.

The transceiver module 10 is further configured to: before transmitting the data of the primary AC of the station within the current transmission opportunity TXOP, receive a trigger frame TF that carries an identifier of the primary AC and that is sent by a wireless access point AP, where the TF is used to instruct the station to aggregate the data of the primary AC.

The second determining module 12 is configured to determine, according to the instruction of the TF, whether there is to-be-transmitted data of the primary AC.

The first aggregation module 13 is configured to: when the second determining module 12 determines that there is to-be-transmitted data of the primary AC, aggregate the data of the primary AC to obtain fourth aggregated data.

That the transceiver module 10 is configured to transmit the data of the primary AC of the station within the current transmission opportunity TXOP includes:

the transceiver module 10 is specifically configured to send the fourth aggregated data to the AP within the TXOP.

Further, the fourth aggregated data includes the data of the at least one secondary AC and the last MPDU of data of the primary AC.

For uplink transmission corresponding to a TF delivered by the AP for any one time, in all aggregated data transmitted by each station, when at least one piece of aggregated data is entirely composed of the data of the primary AC, the uplink transmission is used to instruct the AP to continue instructing, in a TF delivered next time, the station to continue aggregating the data of the primary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of a secondary AC during next uplink transmission.

Further, all the aggregated data transmitted by the station includes an indication field; and for uplink transmission corresponding to a TF delivered by the AP for any one time, in all the aggregated data transmitted by each station, when at least one piece of aggregated data is entirely composed of the data of the primary AC and an indication field in at least one piece of aggregated data is 1, the indication field is used to instruct the AP to continue instructing, in a TF delivered next time, the station to continue aggregating the data of the primary AC during next uplink transmission;

or for uplink transmission corresponding to a TF delivered by the AP for any one time, when all indication fields in aggregated data, including the data of the primary AC, of all the aggregated data transmitted by each station are 0, the indication field is used to instruct the AP to instruct, in a TF delivered next time, the station to aggregate data of a secondary AC during next uplink transmission.

Still further, that the indication field is used to instruct the AP to instruct, in a TF delivered next time, the station to aggregate data of a secondary AC during next uplink transmission specifically includes:

the indication field is used to instruct the AP to instruct, in the TF delivered next time, the station to aggregate, during the next uplink transmission, data of a secondary AC whose priority is higher than that of the primary AC;

or the indication field is used to instruct the AP to instruct, in the TF delivered next time, the station to aggregate data of a secondary AC with a highest priority during the next uplink transmission.

Optionally, the first aggregation module 13 is further configured to aggregate the data of the at least one secondary AC when the second determining module 12 determines that there is no to-be-transmitted data of the primary AC.

Still further, the first aggregation module 13 is specifically configured to: when the second determining module 12 determines, according to the instruction of the TF, that there is no to-be-transmitted data of the primary AC, aggregate data of a secondary AC whose priority is higher than that of the primary AC; or when the second determining module 12 determines, according to the instruction of the TF, that there is no to-be-transmitted data of the primary AC, aggregate data of a secondary AC with a highest priority among the at least one secondary AC.

The station provided in this embodiment of the present invention can execute the third method embodiment. Implementation principles and technical effects thereof are similar to those of the third method embodiment, and details are not described herein again.

Figure 15:
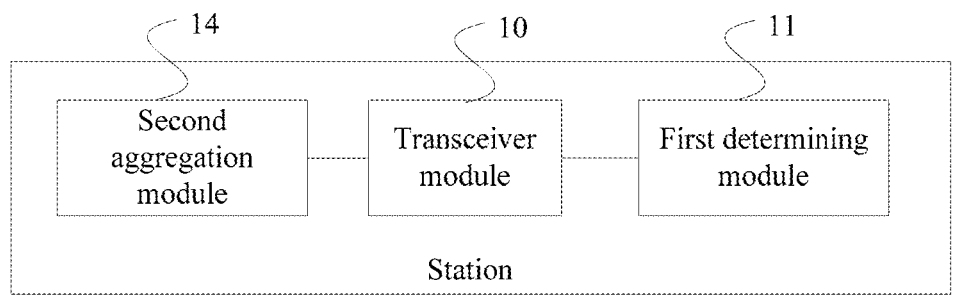
FIG. 15 is a schematic structural diagram of a third station embodiment according to an embodiment of the present invention.

FIG. 15 is a schematic structural diagram of a third station embodiment according to an embodiment of the present invention. Based on the embodiment shown in FIG. 13, the station may further include a second aggregation module 14.

The transceiver module 10 is further configured to: before transmitting the data of the primary AC of the station within the current transmission opportunity TXOP, send a first message to a wireless access point AP; and receive a TF that carries an identifier of the primary AC and that is sent by the AP, where the first message is used to indicate, to the AP, whether there is to-be-transmitted data of each AC of the station, so that the AP sends the trigger frame TF to the station according to the first message, and the TF is used to instruct the station to aggregate the data of the primary AC.

The second aggregation module 14 is configured to aggregate the data of the primary AC according to the TF to obtain fifth aggregated data.

That the transceiver module 10 is configured to transmit the data of the primary AC of the station within the current transmission opportunity TXOP includes: the transceiver module 10 is specifically configured to send the fifth aggregated data to the AP within the TXOP.

Further, the fifth aggregated data includes the data of the at least one secondary AC and the last MPDU of the data of the primary AC.

Optionally, all aggregated data transmitted by the station includes an indication field; and for uplink transmission corresponding to a TF delivered by the AP for any one time, when all the aggregated data transmitted by each station is entirely composed of the data of the primary AC and indication fields in all the aggregated data are 1, the uplink transmission is used to instruct the AP to continue instructing, in a TF delivered next time, the station to aggregate the data of the primary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data does not include the data of the primary AC, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, or when none of the aggregated data includes the data of the primary AC, the uplink transmission is used to instruct the AP to instruct, in a TF delivered next time, the station to aggregate data of a secondary AC during next uplink transmission.

Optionally, for uplink transmission corresponding to a TF delivered by the AP for any one time, when all aggregated data transmitted by each station is entirely composed of the data of the primary AC, the uplink transmission is used to instruct the AP to continue instructing, in a TF delivered next time, the station to aggregate the data of the primary AC during next uplink transmission;

or for uplink transmission corresponding to a TF delivered by the AP for any one time, in all aggregated data transmitted by each station, when at least one piece of aggregated data is entirely composed of the data of the primary AC and at least one piece of aggregated data includes data of a secondary AC, the uplink transmission is used to instruct the AP to instruct, in a TF delivered next time, the station to aggregate the data of the primary AC and data of a secondary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of one or more secondary ACs during next uplink transmission.

The station provided in this embodiment of the present invention can execute the fourth method embodiment. Implementation principles and technical effects thereof are similar to those of the fourth method embodiment, and details are not described herein again.

Figure 16:
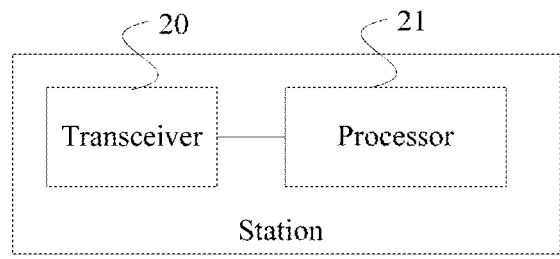
FIG. 16 is a schematic structural diagram of a fourth station embodiment according to an embodiment of the present invention.

FIG. 16 is a schematic structural diagram of a fourth station embodiment according to an embodiment of the present invention. As shown in FIG. 16, a station may include a transceiver 20 and a processor 21.

The transceiver 20 is configured to transmit the data of the primary AC of the station within the current transmission opportunity TXOP, where to-be-transmitted data of the station includes the data of the primary AC and data of at least one secondary AC.

The processor 21 is configured to: after transmission of the data of the primary AC is completed, determine, by the station, whether there is remaining time in the TXOP.

The transceiver 20 is further configured to: when the processor 21 determines that there is remaining time in the TXOP, transmit the data of the at least one secondary AC within the remaining time.

The station provided in this embodiment of the present invention can execute the first method embodiment. Implementation principles and technical effects thereof are similar to those of the first method embodiment, and details are not described herein again.

Optionally, that the transceiver 20 is configured to transmit the data of the at least one secondary AC within the remaining time includes: the transceiver 20 is specifically configured to: determine a priority sequence of first secondary ACs in a first secondary AC group of the station; and sequentially transmit data of the first secondary ACs in the first secondary AC group within the remaining time in a descending priority sequence, where the first secondary AC group includes at least one first secondary AC, and the first secondary AC is a secondary AC that is corresponding to to-be-transmitted data.

Optionally, that the transceiver 20 is configured to transmit the data of the at least one secondary AC within the remaining time includes: the transceiver 20 is specifically configured to: determine, from the at least one secondary AC, a second secondary AC group whose priority is higher than that of the primary AC; and transmit data of the second secondary AC group within the remaining time, where the second secondary AC group includes at least one second secondary AC, and the second secondary AC is a secondary AC that is corresponding to to-be-transmitted data. Further, that the transceiver 20 is specifically configured to transmit the data of the second secondary AC group within the remaining time includes:

the transceiver 20 is specifically configured to: determine a priority of each second secondary AC in the second secondary AC group; and sequentially transmit data of the second secondary ACs within the remaining time in descending order of the priorities of the second secondary ACs.

The station provided in this embodiment of the present invention can execute the two possible implementations in the first method embodiment. Implementation principles and technical effects thereof are similar to those of the first method embodiment, and details are not described herein again.

Optionally, that the transceiver 20 is configured to transmit the data of the primary AC of the station within the current transmission opportunity TXOP includes:

the transceiver 20 is specifically configured to transmit first aggregated data of the station within the TXOP, where the first aggregated data includes the data of the at least one secondary AC and the last MPDU of the data of the primary AC.

That the transceiver 20 is configured to transmit the data of the at least one secondary AC within the remaining time includes: the transceiver 20 is specifically configured to transmit second aggregated data within the remaining time, where the second aggregated data includes the last MPDU of data of a third secondary AC with a highest priority among the at least one secondary AC and data of a secondary AC other than the third secondary AC.

Further, that the transceiver 20 is configured to transmit the data of the at least one secondary AC within the remaining time includes: the transceiver 20 is specifically configured to transmit third aggregated data within the remaining time, where the third aggregated data includes the last MPDU of data corresponding to a higher-priority TID in the secondary AC and at least one MPDU of data corresponding to a lower-priority TID in the secondary AC.

The station provided in this embodiment of the present invention can execute the second method embodiment. Implementation principles and technical effects thereof are similar to those of the second method embodiment, and details are not described herein again.

Optionally, the transceiver 20 is further configured to: before transmitting the data of the primary AC of the station within the current transmission opportunity TXOP, receive a TF that carries an identifier of the primary AC and that is sent by a wireless access point (AP), where the TF is used to instruct the station to aggregate the data of the primary AC.

The processor 21 is further configured to: determine, according to the instruction of the TF, whether there is to-be-transmitted data of the primary AC; and when determining that there is to-be-transmitted data of the primary AC, aggregate the data of the primary AC to obtain fourth aggregated data.

That the transceiver 20 is configured to transmit the data of the primary AC of the station within the current transmission opportunity TXOP includes:

the transceiver 20 is specifically configured to send the fourth aggregated data to the AP within the TXOP.

Further, the fourth aggregated data includes the data of the at least one secondary AC and the last MPDU of the data of the primary AC.

For uplink transmission corresponding to a TF delivered by the AP for any one time, in all aggregated data transmitted by each station, when at least one piece of aggregated data is entirely composed of the data of the primary AC, the uplink transmission is used to instruct the AP to continue instructing, in a TF delivered next time, the station to continue aggregating the data of the primary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of a secondary AC during next uplink transmission.

Further, all the aggregated data transmitted by the station includes an indication field; and for uplink transmission corresponding to a TF delivered by the AP for any one time, in all the aggregated data transmitted by each station, when at least one piece of aggregated data is entirely composed of the data of the primary AC and an indication field in at least one piece of aggregated data is 1, the indication field is used to instruct the AP to continue instructing, in a TF delivered next time, the station to continue aggregating the data of the primary AC during next uplink transmission;

or for uplink transmission corresponding to a TF delivered by the AP for any one time, when all indication fields in aggregated data, including the data of the primary AC, of all the aggregated data transmitted by each station are 0, the indication field is used to instruct the AP to instruct, in a TF delivered next time, the station to aggregate data of a secondary AC during next uplink transmission.

Still further, that the indication field is used to instruct the AP to instruct, in a TF delivered next time, the station to aggregate data of a secondary AC during next uplink transmission specifically includes:

the indication field is used to instruct the AP to instruct, in the TF delivered next time, the station to aggregate, during the next uplink transmission, data of a secondary AC whose priority is higher than that of the primary AC;

or the indication field is used to instruct the AP to instruct, in the TF delivered next time, the station to aggregate data of a secondary AC with a highest priority during the next uplink transmission.

Optionally, the processor 21 is further configured to aggregate the data of the at least one secondary AC when determining that there is no to-be-transmitted data of the primary AC.

Still further, the processor 21 is specifically configured to: when determining, according to the instruction of the TF, that there is no to-be-transmitted data of the primary AC, aggregate data of a secondary AC whose priority is higher than that of the primary AC; or when determining, according to the instruction of the TF, that there is no to-be-transmitted data of the primary AC, aggregate data of a secondary AC with a highest priority among the at least one secondary AC.

The station provided in this embodiment of the present invention can execute the third method embodiment. Implementation principles and technical effects thereof are similar to those of the third method embodiment, and details are not described herein again.

Optionally, the transceiver 20 is further configured to: before transmitting the data of the primary AC of the station within the current transmission opportunity TXOP, send a first message to a wireless access point AP; and receive a TF that carries an identifier of the primary AC and that is sent by the AP, where the first message is used to indicate, to the AP, whether there is to-be-transmitted data of each AC of the station, so that the AP sends the trigger frame TF to the station according to the first message, and the TF is used to instruct the station to aggregate the data of the primary AC.

The processor 21 is further configured to aggregate the data of the primary AC according to the TF to obtain fifth aggregated data.

That the transceiver 20 is configured to transmit the data of the primary AC of the station within the current transmission opportunity TXOP includes:

the transceiver 20 is specifically configured to send the fifth aggregated data to the AP within the TXOP.

Further, the fifth aggregated data includes the data of the at least one secondary AC and the last MPDU of the data of the primary AC.

Optionally, all aggregated data transmitted by the station includes an indication field; and for uplink transmission corresponding to a TF delivered by the AP for any one time, when all the aggregated data transmitted by each station is entirely composed of the data of the primary AC and indication fields in all the aggregated data are 1, the uplink transmission is used to instruct the AP to continue instructing, in a TF delivered next time, the station to aggregate the data of the primary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data does not include the data of the primary AC, and when at least one piece of aggregated data includes the data of the primary AC and an indication field in the aggregated data including the data of the primary AC is 1, the uplink transmission is used to instruct the AP to instruct, in a TF delivered next time, the station to aggregate the data of the primary AC or aggregate the data of the primary AC and data of a secondary AC during next uplink transmission;

or for uplink transmission corresponding to a TF delivered by the AP for any one time, in all the aggregated data transmitted by each station, when at least one piece of aggregated data includes the data of the primary AC and an indication field in the aggregated data including the data of the primary AC is 0, or when none of the aggregated data includes the data of the primary AC, the uplink transmission is used to instruct the AP to instruct, in a TF delivered next time, the station to aggregate data of a secondary AC during next uplink transmission.

Optionally, for uplink transmission corresponding to a TF delivered by the AP for any one time, when all aggregated data transmitted by each station is entirely composed of the data of the primary AC, the uplink transmission is used to instruct the AP to continue instructing, in a TF delivered next time, the station to aggregate the data of the primary AC during next uplink transmission;

or for uplink transmission corresponding to a TF delivered by the AP for any one time, in all aggregated data transmitted by each station, when at least one piece of aggregated data is entirely composed of the data of the primary AC and at least one piece of aggregated data includes data of a secondary AC, the uplink transmission is used to instruct the AP to instruct, in a TF delivered next time, the station to aggregate the data of the primary AC and data of a secondary AC during next uplink transmission;

or for uplink transmission corresponding to a TF delivered by the AP for any one time, when all aggregated data transmitted by each station includes data of a secondary AC, the uplink transmission is used to instruct the AP to instruct, in a TF delivered next time, the station to aggregate data of one or more secondary ACs during next uplink transmission.

The station provided in this embodiment of the present invention can execute the fourth method embodiment. Implementation principles and technical effects thereof are similar to those of the fourth method embodiment, and details are not described herein again.

Figure 17:
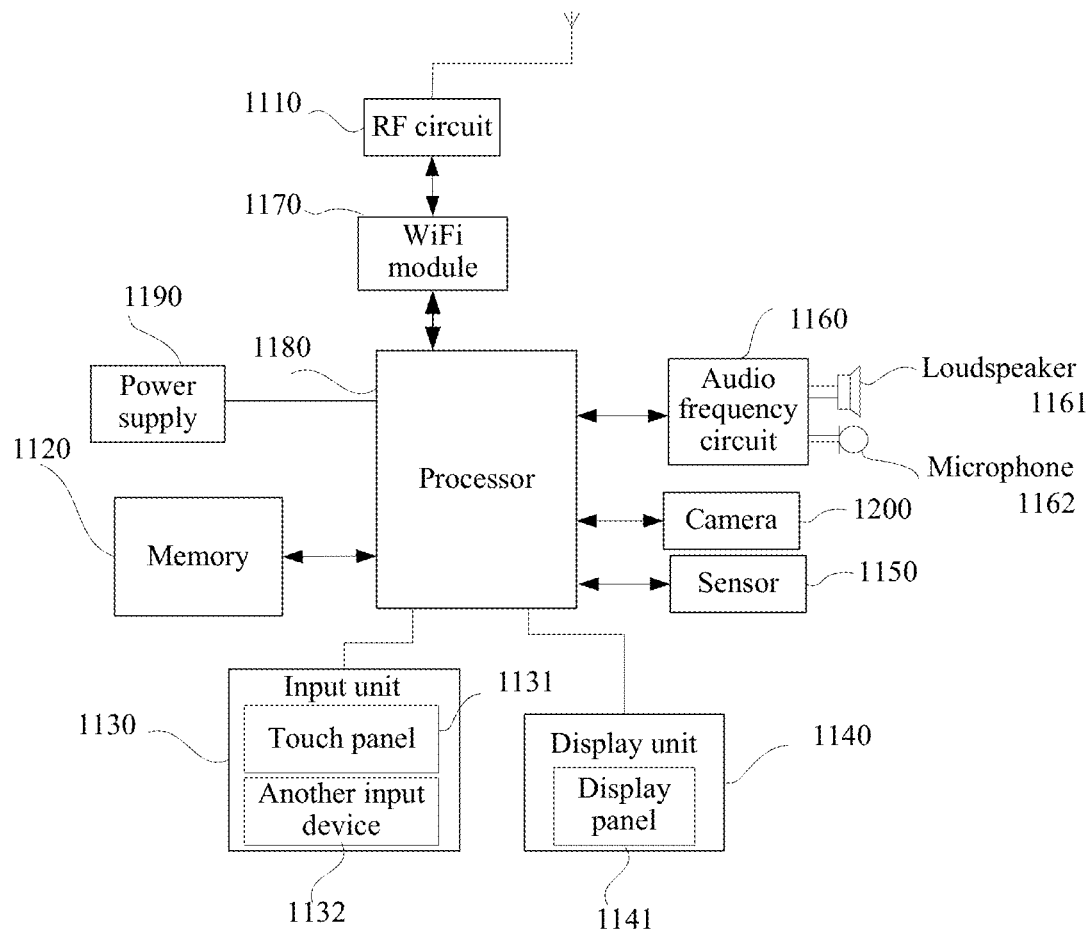
FIG. 17 is a schematic structural diagram of a mobile phone according to the present invention.

As described in the foregoing embodiments, the non-AP station in the embodiments of the present invention may be a wireless communications chip, a wireless sensor, or a wireless communications terminal. Therefore, that the non-AP station is a mobile phone is used as an example. FIG. 17 shows a block diagram of a partial structure of a mobile phone used as a terminal provided in an embodiment of the present invention. Referring to FIG. 17, the mobile phone includes components such as a radio frequency (RF) circuit 1110, a memory 1120, an input unit 1130, a display unit 1140, a sensor 1150, an audio frequency circuit 1160, a Wireless Fidelity (WiFi) module 1170, a processor 1180, and a power supply 1190. Persons skilled in the art may understand that the mobile phone structure shown in FIG. 17 does not constitute any limitation on a mobile phone, and the mobile phone may include more or fewer components than those shown in the figure, or a combination of some components, or the components disposed differently.

The following describes each constituent part of the mobile phone in detail with reference to FIG. 17.

The RF circuit 1110 may be configured to: receive and send a signal in an information receiving and sending process or a call process; and in particular, after receiving downlink information of a base station, send the downlink information to the processor 1180 for processing; in addition, send uplink data to the base station. Generally, the RF circuit includes but is not limited to an antenna, at least one amplifier, a transceiver, a coupler, a low noise amplifier (LNA), and a duplexer. In addition, the RF circuit 1110 may also communicate with a network and another device by means of wireless communication. For the wireless communication, any communications standard or protocol may be used, including but not limited to Global System for Mobile Communications (GSM), General Packet Radio Service (GPRS), Code Division Multiple Access (CDMA), Wideband Code Division Multiple Access (WCDMA), Long Term Evolution (LTE).

The memory 1120 may be configured to store a software program and a module. The processor 1180 performs various application functions of the mobile phone and data processing by running the software program and the module that are stored in the memory 1120. The memory 1120 may mainly include a program storage area and a data storage area. The program storage area may store an operating system, an application program required by at least one function (such as a voice playback function and an image display function), and the like; and the data storage area may store data (such as audio data and a phone book) created according to the use of the mobile phone, and the like. In addition, the memory 1120 may include a high-speed random access memory, and may further include a non-volatile memory such as at least one magnetic disk storage device, a flash memory device, or another volatile solid-state storage device.

The input unit 1130 may be configured to receive input digital or character information and generate key signal input related to user setting and function control of the mobile phone 1100. Specifically, the input unit 1130 may include a touch panel 1131 and another input device 1132. The touch panel 1131 is also referred to as a touchscreen and may collect a touch operation (such as an operation performed by a user on the touch panel 1131 or near the touch panel 1131 by using any proper object or accessory, such as a finger or a stylus) performed by the user on or near the touch panel 1131, and drive a corresponding connection apparatus according to a preset program. Optionally, the touch panel 1131 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 1180, receives a command sent by the processor 1180, and execute the command. In addition, the touch panel 1131 may be implemented by using multiple types, such as a resistive type, a capacitive type, an infrared type, and a surface acoustic wave type. In addition to the touch panel 1131, the input unit 1130 may include the another input device 1132. Specifically, the another input device 1132 may include but is not limited to one or more of a physical keyboard, a function key (such as a volume control key or an on/off key), a trackball, a mouse, or a joystick.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (LCD), an organic light-emitting diode (OLED), and the like. Further, the touch panel 1131 may cover the display panel 1141. After detecting a touch operation on or near the touch panel 1131, the touch panel 1131 transmits information about the touch operation to the processor 1180 to determine a touch event type, and then the processor 1180 provides corresponding visual output on the display panel 1141 according to the touch event type. In FIG. 7, the touch panel 1131 and the display panel 1141 are used as two independent components to implement input and output functions of the mobile phone. However, in some embodiments, the touch panel 1131 and the display panel 1141 may be integrated to implement the input and output functions of the mobile phone.

The mobile phone may further include at least one sensor 1150 such as a light sensor, a motion sensor, or another sensor. Specifically, the light sensor may include an ambient light sensor and a proximity sensor. The ambient light sensor may adjust luminance of the display panel 1141 according to brightness of ambient light, and the proximity sensor may turn off the display panel 1141 and/or backlight when the mobile phone moves close to an ear. As a type of motion sensor, an acceleration sensor may detect values of acceleration in directions (generally three axes), may detect, in a static state, a value and a direction of gravity, and may be used for an application that identifies a posture (such as screen switching between a landscape mode and a portrait mode, a related game, and magnetometer posture calibration) of the mobile phone, a vibration-identification-related function (such as a pedometer and tapping), and the like. Other sensors that can be configured on the mobile phone such as a gyroscope, a barometer, a hygrometer, a thermometer, and an infrared sensor are not described herein.

The audio frequency circuit 1160, a loudspeaker 1161, and a microphone 1162 may provide an audio interface between the user and the mobile phone. The audio frequency circuit 1160 may transmit, to the loudspeaker 1161, an electrical signal that is obtained after conversion of received audio data, and the loudspeaker 1161 converts the electrical signal into a sound signal and outputs the sound signal. In addition, the microphone 1162 converts a collected sound signal into an electrical signal; the audio frequency circuit 1160 receives and converts the electrical signal into audio data, and outputs the audio data to the processor 1180 for processing; and then processed audio data is sent to, for example, another mobile phone by using the RF circuit 1110, or the audio data is output to the memory 1120 for further processing.

WiFi belongs to a short-distance wireless transmission technology. By using the WiFi module 1170, the mobile phone may help the user receive and send an email, browse a web page, access streaming media, and the like. The WiFi module 1170 provides wireless access to the broadband Internet for the user. Although FIG. 7 shows the WiFi module 1170, it can be understood that the WiFi module 1170 is not a mandatory constituent of the mobile phone, and may be totally omitted as required without changing the essence scope of the present invention.

The processor 1180 is a control center of the mobile phone, is connected to all the parts of the entire mobile phone by using various interfaces and lines, and executes, by running or executing the software program and/or the module that are/is stored in the memory 1120 and by invoking data stored in the memory 1120, various functions of the mobile phone and data processing, so as to perform overall monitoring on the mobile phone. Optionally, the processor 1180 may include one or more processing units. Preferably, an application processor and a modem processor may be integrated into the processor 1180. The application processor mainly processes an operating system, a user interface, an application program, and the like, and the modem processor mainly processes wireless communication. It can be understood that the modem processor may alternatively not be integrated into the processor 1180.

The mobile phone further includes the power supply 1190 (such as a battery) that supplies power to all the components. Preferably, the power supply may be logically connected to the processor 1180 by using a power management system, so that functions such as charging and discharging management and power consumption management are implemented by using the power management system.

The mobile phone may further include a camera 1200. The camera may be a front-facing camera, or may be a rear-facing camera. Although not shown, the mobile phone may further include a Bluetooth module, a GPS module, and the like. Details are not described herein.

In this embodiment of the present invention, the processor 1180 included in the mobile phone may be configured to execute the foregoing data transmission method embodiments. Implementation principles and technical effects thereof are similar to those of the foregoing data transmission method embodiments, and details are not described herein again.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method by a station, comprising:

generating an aggregated data, wherein: the aggregated data includes one or more media access control protocol data units (MPDUs) of a primary access category (AC), the MPDUs of the primary AC includes a last MPDU of the primary AC, the aggregated data further includes data of a secondary AC, a priority of the secondary AC is determined to be higher than a priority of the primary AC, and the length of the aggregated data does not exceed a transmission opportunity (TXOP) of the primary AC; and transmitting the aggregated data within the TXOP, wherein before generating the aggregated data, the method comprises:

if a length of remaining data of the primary AC does not reach a transmission length allowed by the station, the station generates the aggregated data.

2. The method according to claim 1, further comprising:

obtaining, before generating the aggregated data, the TXOP of the primary AC.

3. A station, comprising:

a transceiver;

a processor; and computer-executable instructions that, when executed by the processor, facilitate the station carrying out a method comprising:

generating an aggregated data, wherein, the aggregated data includes one or more media access control protocol data unit (MPDUs) of a primary AC, the MPDU of the primary AC includes the last MPDU of the primary AC, the aggregated data further includes data of at least one secondary AC, a priority of the secondary AC is higher than a priority of the primary AC, and the length of the aggregated data does not exceed a transmission opportunity (TXOP) of the primary AC; and transmitting, by the processor cooperatively operating with the transceiver, the aggregated data within the TXOP, wherein before generating the aggregated data, the method comprises:

if a length of remaining data of the primary AC does not reach a transmission length allowed by the station, the station generates the aggregated data.

4. The station according to claim 3, wherein, before generating the aggregated data, the method further comprises obtaining the TXOP of the primary AC.

5. The method according to claim 1, wherein the station is a non-AP station.

6. The method according to claim 5, wherein the method further comprises:

receiving, before the generating, a trigger frame that carries an identifier of the primary AC.

7. The station according to claim 3, wherein the station is a non-AP station.

8. The station according to claim 7, wherein the method carried out by the station further comprises receiving, before the generating, a trigger frame that carries an identifier of the primary AC.

* * * * *